US008080096B2

(12) United States Patent
Yamashita et al.

(10) Patent No.: US 8,080,096 B2
(45) Date of Patent: Dec. 20, 2011

(54) PROTECTING AGENT FOR IMAGE BEARING MEMBER AND PRODUCTION METHOD THEREFOR, PROTECTION LAYER FORMING APPARATUS, IMAGE FORMING METHOD, IMAGE FORMING APPARATUS, AND PROCESS CARTRIDGE

(75) Inventors: Masahide Yamashita, Tokyo (JP); Hiroshi Nakai, Yokohama (JP); Jun Yura, Yokohama (JP); Masato Iio, Yokohama (JP); Shinya Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1043 days.

(21) Appl. No.: 11/686,047

(22) Filed: Mar. 14, 2007

(65) Prior Publication Data

US 2007/0224528 A1 Sep. 27, 2007

(30) Foreign Application Priority Data

Mar. 23, 2006 (JP) ................................. 2006-081126
Jan. 16, 2007 (JP) ................................. 2007-006718

(51) Int. Cl.
*G03G 5/147* (2006.01)
*C09D 13/00* (2006.01)

(52) U.S. Cl. .................. 106/31.08; 430/126.2; 430/132; 430/66; 399/159

(58) Field of Classification Search ........................ None
See application file for complete search history.

(56) References Cited

U.S. PATENT DOCUMENTS 3,501,294 A 3/1970 Joseph
5,171,653 A * 12/1992 Jugle et al. ................. 430/108.3
5,655,199 A 8/1997 Yamashita et al.
5,774,775 A 6/1998 Aoto et al.
5,873,018 A 2/1999 Aoto et al.
6,030,736 A 2/2000 Ikegami et al.
7,653,339 B2 * 1/2010 Yamashita et al. ............ 399/346
2005/0196193 A1 9/2005 Tamoto et al.

FOREIGN PATENT DOCUMENTS

| | | |
|---|---|---|
| GB | 1 209 644 | 10/1970 |
| JP | 51-22380 | 7/1976 |
| JP | 60-025787 | * 2/1985 |
| JP | 05-249743 | * 9/1993 |
| JP | 2000-330441 | 11/2000 |
| JP | 2002-97483 | 4/2002 |
| JP | 2004-302451 | 10/2004 |
| JP | 2005-99125 | 4/2005 |
| JP | 2005-274737 | 10/2005 |

OTHER PUBLICATIONS

U.S. Appl. No. 08/639,961, filed Apr. 29, 1996, Jun Aoto, et al.

* cited by examiner

*Primary Examiner* — Melvin Mayes
*Assistant Examiner* — Yun Qian
(74) *Attorney, Agent, or Firm* — Oblon, Spivak, McClelland, Maier & Neustadt L.L.P.

(57) ABSTRACT

To provide an image bearing member protecting agent that includes at least a hydrophobic organic compound and an amphiphile organic compound. Preferred embodiments are that the hydrophobic organic compound is a hydrocarbon wax, and the hydrocarbon wax is at least a wax selected from normal paraffins, isoparaffins, and cycloparaffins; and that the amphiphile organic compound is an polyalcohol esterified compound including a nonionic surface active surfactant, and the nonionic surface active surfactant is an alkyl carboxylic acid represented by a structural formula, $C_nH_{2n+1}COOH$.

10 Claims, 3 Drawing Sheets

PROTECTING AGENT FOR IMAGE BEARING MEMBER AND PRODUCTION METHOD THEREFOR, PROTECTION LAYER FORMING APPARATUS, IMAGE FORMING METHOD, IMAGE FORMING APPARATUS, AND PROCESS CARTRIDGE

BACKGROUND OF THE INVENTION

1. Field of the Invention

The present invention relates to an image bearing member protecting agent for protecting a surface of an image bearing member which is used for forming electrophotographic images, a production method for the image bearing member protecting agent, a protection layer forming apparatus for forming a protection layer on the surface of the image bearing member using the image bearing member protecting agent, an image forming method, an image forming apparatus, and a process cartridge.

2. Description of the Related Art

Traditionally, electrophotographic image forming forms a visible image by having charged toner adhere to a static-charged latent electric field image formed with a static charge and formed on an image bearing member which has a photoconductive layer containing photoconductive substances thereon. The visible image is then transferred onto a recording media such as paper, and given heat, pressure, or solvent gas so that the visible image is fixed on the recording media, and thus an output image is obtained.

Classifying such image forming based on the toner charging process for visible image forming, developing process of electrophotographic is divided into two types of processes: a two-component developing process wherein frictional electrification generated through mixing and stirring toner particles and carrier particles is employed, and an one-component developing process wherein toner is charged without carrier. The one-component developing process is further divided into two categories: a magnetic-one-component developing process and a non-magnetic one-component developing process, based on whether or not magnetic force is used for keeping toner on a development roller.

Because the two-component developing process has higher stability of charge property, faster rising time, and more advantageous in maintaining high quality image over a long-period of time than the one-component developing process, the two-component developing process is widely used for complex units and copier-based complex units which require high-speed and high image reproducibility. On the other hand, for small printers and fax machines, as they need to be downsized and produced at low cost, the one-component developing system is widely adopted.

Recently, demands of better image quality and higher stability of image quality in both component developing systems increase accompanying with the spreading popularity of color image output. In order to obtain better image quality, the average particles diameter of toner is becoming smaller and the particles shape of toner is getting rounder with no angulate parts.

An electrophotographic image forming apparatus of any component developing system generally rotates an image bearing member, which is generally drum-shaped or belt-shaped, to uniformly charge the image bearing member, forms a latent image pattern on the image bearing member using, for example, laser beam irradiation, visualizes the latent image pattern into a toner image using a toner, and then transfers the toner image on a recording medium. Toner components may remain on the surface of the image bearing member after the toner image has been transferred to the recording medium. The remaining components will prevent uniform charging on the image bearing member during a charging step, and therefore, the surface of the image bearing member will be charged after removing the remaining components and cleaning the surface thereof with a cleaning unit using such as a cleaning blade.

Different kinds of electrical stresses and physical stresses given in steps such as charging, developing, transferring and cleaning steps, on the surface of the image bearing member change the surface over a period of time. Of those stresses, frictional stress generated at the cleaning process causes abrasion of the image bearing member and scratches on its surface. To solve this problem, or to reduce the friction between the image bearing member and cleaning blade, there have been various proposals regarding lubricants, supply of lubrication components and lubrication forming methods.

To prolong the life period of the photoconductor and cleaning plate, for example, Japanese Patent Application Publication (JP-B) No. 51-22380 proposes a lubrication film forming method wherein a lubrication film can be created on the surface of the photoconductor by supplying thereon a solid lubricant which mainly consists of zinc stearate.

Japanese Patent Application Laid-Open (JP-A) No. 2005-274737 proposes using a lubricant supply unit, which provides lubricant having higher alcohol of 20 to 70 carbon atoms. The higher alcohol provided from the unit stays in form of amorphous particles at the edge of blade nip member, providing adequate wet condition on the surface of the image bearing member and enabling maintaining lubrication property.

JP-A No. 2002-97483 proposes using powder of an alkylene bis alkyl acid amide compound as a lubrication component, and using the compound provides powder in the surface boundaries between an image bearing member and a cleaning blade in a contacting condition with the image bearing member, providing smooth lubrication effect on the surface thereof for a long period.

As mentioned above, stresses on the image bearing member are generated from not only the cleaning step but also from other steps, and particularly a charging step generates an electrical stress which greatly changes the surface condition of the image bearing member. The electrical stress strongly appears especially in a contact-charging system and a proximity-charging system which is accompanied by discharging phenomenon occurred near the surface of the image bearing member. Those types of charging systems generate active species and reaction products at the surface of the image bearing member, and have large occurrence of adhesions of the active species and reaction products, which are generated in the discharging area atmosphere, to the surface of the image bearing member.

Thus, although a type of lubricants, such as the lubricant of above mentioned JP-B No. 51-22380, using zinc stearate can uniformly cover the surface of an image bearing member and provide preferable lubrication thereon, zinc stearate of the lubricants may be dissolved and finally remain at the surface of the image bearing member and/or the surface of charge member in the form of zinc oxidizes over a period of time when lubricants are repeatedly exposed to charging step. The zinc oxidizes remaining at the surface have moisture-absorption characteristics and they absorb moisture existing in air with reducing resistance, so a static charge cannot be kept on the image bearing member under a high-humidity condition, and thus that may cause obscureness of a latent electric field image and an image failure, resulting in an occurrence of grainy images.

Lubricants containing higher alcohol, such as lubricant of above-mentioned JP-A No. 2005-274737, will be easily spread on the surface of the image bearing member and can be expected to have lubrication efficiency, however, adsorption area per one molecule of higher alcohol adsorbing to the image bearing member tends to be larger, reducing the density of particles adsorbing to the unit area of an image bearing member, or the adsorption molecular weight per the unit area, and the above-mentioned electrical stress can easily pass through the protection layer, thus enough protection for the image bearing member will be hard to be achieved.

A lubricant having nitrogen atoms in molecules therein, such as the lubricant of the above-mentioned JP-A No. 2002-97483, itself may generate decomposition products having ion-dissociative property, like nit oxides and ammonium-containing compounds, when electrical stress is applied thereon. The products are then contained into a lubrication layer, reducing resistance under a high-humidity condition and may result in occurrences of grainy images.

Prolonging the life period of image forming apparatus and members therefor has drawing high interest in the market in terms of lowering running cost and reducing waste products for protecting the earth's environment. For example, an approach has been tried to prolong the life period of image bearing member through increasing mechanical durability through covering the surface of an image bearing member with a particular surface layer having cross-linked structures. (See JP-A No. 2004-302451)

As mentioned above, once low resistance substances are incorporated into the lubrication layer of the image bearing member, removing those substances requires removing the entire lubrication layer with, for example, a cleaning mechanism, and because of the slippery surface of the lubrication layer, removing requires great force and gives great amount of mechanical stress on the image bearing member itself. Thus, even covering the surface of the image bearing member with the particular surface layer having cross-linked structure, as of above mentioned JP-A No. 2004-302451, has not drastically changed the life period of the image bearing member yet.

Recently, polymerization toners which are produced through polymerization process are placing on the market, aiming at higher image quality and low production energy. Those toners have excellent characteristics wherein particles have fewer angulate parts, and the particle diameters are small and uniform compared with toners produced through grinding processes. However, a disadvantage of those toners is that a cleaning step, employing a cleaning blade such as a rubber cleaning blade, during which the surface of the image bearing members is cleaned, tends to have cleaning failures because remaining toner components will not be easily removed as removing the remaining toner components will be affected by shapes and particle diameters of the polymerization toner that make it difficult to catch the components with the edge of a cleaning part of the cleaning blade pushed onto the surface of the image bearing member to contact therewith.

JP-A No. 2000-330441 proposes an example of a cleaning unit that can overcome the above-stated toner cleaning failures. It proposes an image forming apparatus which can give pressure, the pressure satisfies specific conditions measured on the volume average particle diameter of toner, D, and average degree of circularity, S. According to the proposal, strong pressure force, f, applied on a counter type cleaning blade, may cause noise generation and/or warpage of the cleaning blade, thus it insists that an empirical upper limit value should be set.

JP-A No. 2005-99125 proposes a cleaning unit wherein a friction coefficient of toner and an image bearing member, a friction coefficient of toner and a cleaning blade, an adhesion force of toner and the image bearing member, a force applied to toner given by the blade, and an angle between the blade and the image bearing member, or a cleaning angle, are specified, designed for removing particles having smaller average particle diameters and closer globular shapes.

The above mentioned JP-A No. 2000-330441 and JP-A No. 2005-99125 propose methods for reducing the stress on the image bearing member given from the cleaning unit while improving cleaning property at cleaning globular shapes toner, particularly as typified by a polymerization toner, however, they neither disclose or suggest method concerning prolonging the life period of the image bearing member while reducing the electrical stress applied thereon.

Thus, even tough protecting the surface of the image bearing member from electrical stress generated in the charging process is significantly important for prolonging the life period of image bearing members and charge members and for stabilizing image qualities, the protecting method is still in dispute and has many examinations on the methods yet to be made.

BRIEF SUMMARY OF THE INVENTION

An object of the present invention is to provide an image bearing member protecting agent, which can protect an image bearing member from electrical stresses, generated from such as a charging step, and mechanical stresses, generated from such as the friction between the image bearing member and the cleaning blade, and wherein a deteriorated protecting agent, deterioration thereof caused by the electrical stresses, has low effect on the image quality and around members, a method for producing the image bearing member protecting agent, a protection layer forming apparatus forming the layer using the image bearing member protecting agent, an image forming method that can consistently form high quality images, an image forming apparatus, and a process cartridge.

The image bearing member protecting agent of the present invention contains at least a hydrophobic organic compound and an amphiphile organic compound.

Herein, the image bearing member protecting agent is considered to be forming an excellent protection layer formed through the following mechanism.

During the image forming process of the image forming apparatus, the surface hydrophilicity of the image bearing member will be increased through molecular chain cleavage, oxidization from oxygen in the atmosphere and vapor adhesions, which are caused from electrical stresses generated from a charging step and a transferring step.

When a partially-hydrophilized surface of the image bearing member is covered with the image bearing member protecting agent of the present invention, the hydrophilized areas of the surface of the image bearing member can be hydrophobized with a hydrophilic site of molecules adsorbing to the hydrophobic areas thereof, a hydrophilic structure which is contained in amphiphile organic compounds of the protecting agent, wherein the amphiphile organic compounds contains both the hydrophilic-natured structure and a lipophilic-natured (hydrophobic) structure in the molecule.

Furthermore, the adsorbed hydrophobic structure of the amphiphile organic compound and the hydrophobic organic compound are considered to be forming a uniform protection layer complexed with the intermolecular interaction arisen through intermolecular force.

The top layer of the protection layer formed on the surface of the image bearing member contains hydrophobicity sites at outermost surface of the protection layer, thus even if many hydrophilic substances exist in the atmosphere near the surface of the image bearing member, the substances cannot easily adhere to the surface thereof. That protection layer can also prevent the reduction of the resistance of the surface of the image bearing member and the dispersion of a latent-electric-field-image-charge even under a high humidity condition. Furthermore, after the protection layer is formed on the surface of the image bearing member, as electrical stress generated in the charging step and the transferring step is applied to the image bearing member protecting agent forming the protection layer, the protection layer will experience molecular chain disconnection, oxidization and hydrophilizing thereof. Thus, parts of the protection layer can be dissolved, however, the electrical stress applied on the image bearing member will drastically decrease, and the above-stated deterioration of the image bearing member will be prevented, allowing the image bearing member to be used for a long period of time.

Some portion of the protecting agent component will be deteriorated from the electrical stress and will have hydrophilicity, however, the deteriorated component parts will be surrounded with surplus hydrophilic sites of the amphiphile organic compound contained in the protection layer, forming inverted micelles in the protection layer formed on the surface of the image bearing member, and thereby the influence from surrounding humidity will be prevented. Furthermore, the intermolecular interaction with hydrophobic organic component holds the inverted micelles in the protection layer of image bearing member and prevents the deteriorated hydrophilic component from strongly adsorbing to other parts. Therefore, the protecting agent component containing those deteriorated components can be easily removed to the outside of the image forming system using a cleaning mechanism, and thus, the protection layer of the surface of the image bearing member can be kept refreshed.

Moreover, when a part of protecting agent component was deteriorated with bond disconnection of terminals of protecting agent molecules, the terminals having low molecular weight vaporize through, for example, energy of a charge area, and most of the vaporized parts are emitted outside the image forming system carried by a stream. Of vaporized deteriorated protecting agent components, those having relatively large molecular weight and condensable at temperature of surrounding members may adhere or adsorb to the charge member, but those low molecular weight components can easily be decomposed during a successive charging process, just as other low molecular weight components, so they can be emitted outside the image forming system and thereby generating almost no effect accumulation over time on the surrounding members. And thus, for example, a problem wherein a lubricant component containing metal element is dissolved and oxidized, becomes metal-oxides, accumulates on the charge member with contaminating the charge member, and increases resistance thereof, can be solved by using the image bearing member protecting agent of the present invention.

The production method for the image bearing member protecting agent of the present invention is the method for producing the above mentioned image bearing member protecting agent, and the protecting agent is produced by the following steps:

a molten image bearing member protecting agent is poured into a metal mold and cooled to temperature equal to or below its phase transition point; and the protecting agent is reheated to its phase transition temperature.

And thus, the production method for the image bearing member protecting agent of the present invention, wherein the image bearing member protecting agent is cooled to temperature equal to or below its phase transition point and reheated to its phase transition temperature during melt molding process, can efficiently produce the image bearing member protecting agent of the present invention, having a condition without internal strain.

The image forming method of the present invention includes at least a latent electric field image forming step in which a latent electric field image is formed on the image bearing member, a developing step in which a visible image is formed through developing the latent electric field image using a toner, a transferring step in which the visible image is transferred onto a recording medium, a protection layer forming step in which a protection layer is formed on the surface of the image bearing member, after which has been used for transferring the visible image, through supplying the protecting agent of the present invention on the surface of the image bearing member, and a fixing step in which a transferred image is fixed on the recoding medium.

The image forming apparatus of the present invention includes at least a latent electric field image forming unit configured to form a latent electric field image on the image bearing member, a developing unit configured to form a visible image through developing the latent electric field image using a toner, a transferring unit configured to transfer the visible image onto a recording medium, a protection layer forming unit configured to form a protection layer on the surface of the image bearing member, after which has been used for transferring the visible image, through supplying the protecting agent of the present invention on the surface of the image bearing member, and a fixing unit configured to fix a transferred image on the recoding medium.

Generally, the image bearing member protecting agent of the present invention is often relatively flexible and have plasticity. Therefore, as applying a mass of the image bearing member protecting agent directly onto the surface of the surface of the image bearing member can cause excessive supply and reduce the protection layer forming efficiency, forming multi-layers which prevent optical transmission of light of, for example, exposing step in which a latent electric field image is formed, usable types of image bearing member protecting agent are limited. However, placing a supplying member, a medium through which the image bearing member protecting agent can be supplied on the surface of the image bearing member, between the image bearing member protecting agent and the image bearing member of the protection layer forming apparatus constructed as mentioned above, can uniformly supply the protecting agent onto the surface thereof even when the mass of the image bearing member protecting agent is a flexible solid.

The image bearing member of the image forming apparatus of the present invention can last for a long period of time by using the protection layer forming unit, having the image bearing member protecting agent, of the present invention. Particularly for the image bearing member having thermosetting resin in outermost area of the surface layer, the image bearing member protecting agent can protect the image bearing member from being deteriorated caused by electrical stress, and thus the image bearing member protecting agent can provide long durability for image bearing member containing thermosetting resin against mechanical stress applied on the image bearing member. Because of the durability, the image bearing member can have long durability which virtually requires no replacement.

A charging unit placed at a contact condition with the surface of the image bearing member or a location near thereto can have the discharging area located near to the surface of the image bearing member, and thus electrical stress applied thereon tends to be increased, but the image forming apparatus, having the image bearing member with protection layer formed thereon, of the present invention can protect the image bearing member from electrical stresses.

Furthermore, the component of the image bearing member of the present invention virtually contains no metal composition, preventing metal oxide contamination of the charging unit located at contact condition or location near thereto and improving durability of the charging unit.

Because the protection layer formed on the surface of the image bearing member extremely minimizes surface condition changes thereof, stable cleanability for the surface of the image bearing member and toner removability can be provided even for a toner having a large average degree of particle circularity or a small average particle diameter for a long period of time.

The process cartridge of the present invention includes at least an image bearing member and a protection layer forming unit forming a protection layer on the surface of a image bearing member through supplying an image bearing member protecting agent thereon, and the process cartridge can be detachably attached to the image forming apparatus, and the image bearing member protecting agent contains at least a hydrophobic organic compound and an amphiphile organic compound.

The process cartridge of the present invention, the cartridge having the protection layer forming unit of the present invention using the image bearing member protecting agent, reduces running cost and significantly cut waste by providing distinctly long exchange interval of the process cartridge. Particularly for the image bearing member having thermosetting resin in the top surface layer, the image bearing member protecting agent can protect the image bearing member from being deteriorated, deterioration thereof caused by electrical stresses, and thus the image bearing member protecting agent can provide a long durability for the image bearing member containing thermosetting resin against mechanical stresses applied thereon.

Furthermore, because the component of the image bearing member of the present invention virtually contains no metal composition, metal oxide contamination of the charging unit located at contact condition or location near thereto can be prevented and over-time degradation of the charging unit can be minimized.

Figure 1:
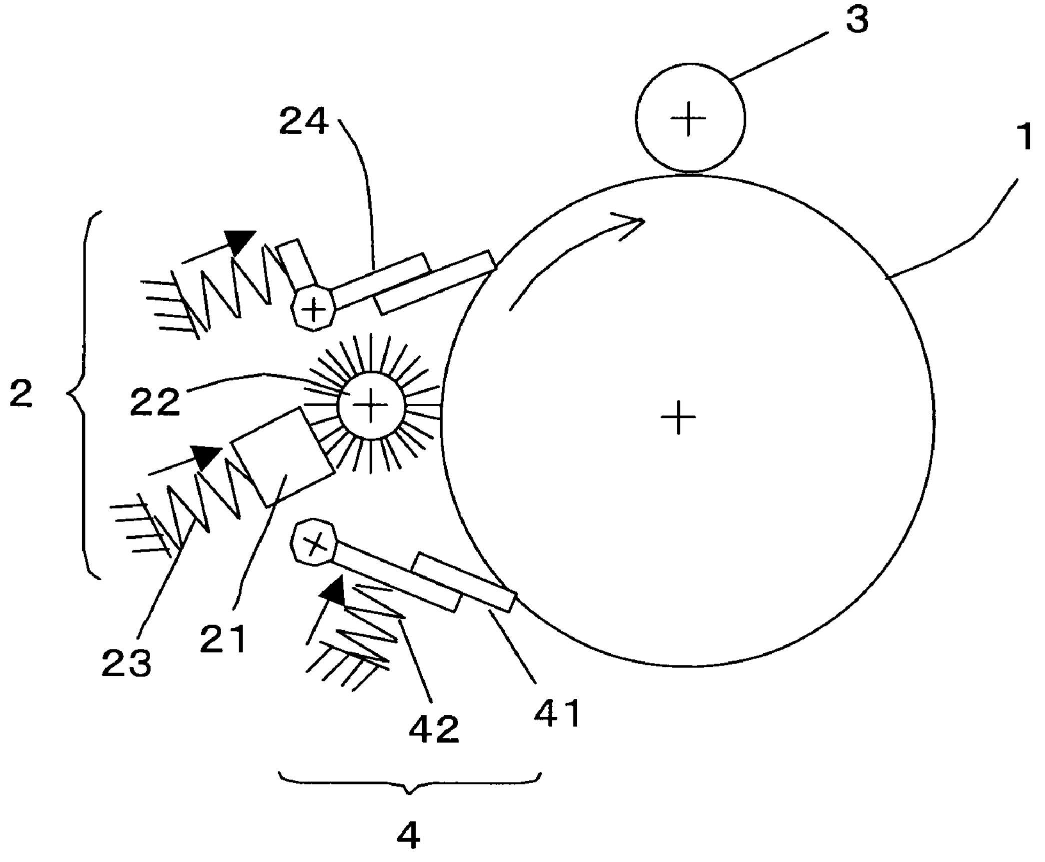
FIG. 1 is a schematic diagram showing an example of the protection layer forming apparatus of the present invention.

DETAILED DESCRIPTION OF THE INVENTION (Image Bearing Member Protecting Agent)

The image bearing member protecting agent of the present invention contains at least a hydrophobic organic compound and an amphiphile organic compound. And other compounds may be included upon necessity.

<Hydrophobic Organic Compound>

Choices of the above-stated hydrophobic organic compound are not limited and suitable one or more can be selected in accordance with necessity, but should preferably be one having an affinity only for lipophilic (hydrophobic) sites of an amphiphile organic compound. Examples are hydrocarbon waxes which classified into aliphatic saturated hydrocarbon, aliphatic unsaturated hydrocarbon, alicyclic saturated hydrocarbon, alicyclic unsaturated hydrocarbon, or aromatic hydrocarbon; fluorine resins and fluorine waxes such as polytetrafluoroethylene (PTFE), poly perfluoro alkyl ether (PFA), perfluoro ethylene-perfluoro propylene copolymer (FEP), polyvinylidene fluoride (PvdF) and ethylen-tetrafluorethylen (ETFE); silicon resins and silicon waxes, such as polymethyl silicon and poly methylphenyl silicon. These compounds can be used alone or in combination.

Of those compounds, aliphatic saturated hydrocarbon and alicyclic saturated hydrocarbon which have saturation binding having low reactivity and stability in their molecular bindings, normal paraffins, isoparaffins, cycloparaffins which have better temporal stability as which are less likely to undergo addition reactions and oxidation reactions in usual air environment, and are chemically stable, are preferable, and normal paraffins are particularly preferable.

Using normal paraffins for the hydrophobic organic compound can ensure removing deteriorated products, which exist in the protection layer in a form of reverse micelles, through making the cross-interaction with lipophilic sites of amphiphile organic compound moderate and enabling keeping the protection layer formed on the surface of the image bearing member refreshed, thereby, using normal paraffins for the hydrophobic organic compound is particularly preferable.

The weight-average molecular weight (Mw) of the hydrophobic organic compound should preferably be in the range of from 350 to 850, and more preferably in the range of from 400 to 800. When the weight-average molecular weight of the hydrophobic organic compound is too small, the protection layer formed on the surface of the image bearing member will be deteriorated from being exposed to electrical stress, and thus enough protection effect cannot be obtained. On the other hand, when the weight-average molecular weight of the hydrophobic organic compound is too larger, enough drawing property of the protecting agent will not be obtained so that protecting agent component will adhere on the image bearing member in form of powder particles, not forming the protection layer. In these conditions, the hydrophobic organic compound has less protection effect for the image bearing member, while the amphiphile organic compound on the surface of the image bearing member takes a large part of the protection effect therefor.

<Amphiphile Organic Compound>

Examples of amphiphile organic compounds are anion surfactants, cationic surfactants, amphoteric ion surfactants, nonionic surfactants and such like. They can be used alone or in combination.

Examples of the anion surfactants are compounds having anion at the terminal of hydrophobic sites, such as alkylbenzene sulfonates, alpha olefin sulfonates, alkanesulfonates, alkyl sulfates, alkyl polyoxyethylene sulfates, alkyl phosphates, long-chain fatty acid salts, α-sulfonated fatty acid esters, alkyl ether sulfates, combined with ions such as alkali metal ions, such as sodium and kaliums; alkali earth metal ions, such as magnesium and calcium; metal ions, such as al aluminum and zincs; and ammonium ions.

Examples of the cationic surfactants are compounds having cation at the terminal of hydrophobic sites, such as alkyl trimethylammonium salts, dialkyl methylammonium salts, alkyldimethylbenzylammonium salts, combined with, for example, chlorine, fluorine, bromine, phosphate ion, nitrate ion, sulfate ion, thiosulfate ion, carbonate ion, hydroxy-ion.

Examples of the amphoteric ion surfactants are dimethylalkylamine oxide, N-alkylbetaine, imidazoline derivative and alkyl amino acid.

Examples of the nonionic surfactants are alcohol compounds, ester compounds and amide compounds, such as long-chain alkyl alcohols, alkylpolyoxyethylene ethers, alkylphenol ethoxylates, fatty acid diethanolamides, alkyl poly glucoxides and polyoxyethylene sorbitan alkyl esters. Also, long-chain alkylcarboxylic acids, such as lauric acid, palmitic acid, stearic acids, behenic acid, lignoceric acid, cerinic acid, montanic acid and melissic acid, polyalcohols, such as ethylene glycol, propylene glycol, glycerine, erythritol, hexitoly, or ester compound combined with these part-anhydrides are other preferable examples.

Examples of the above-stated amphiphile organic compound are anion surfactants, cationic surfactants, amphoteric ion surfactants and nonionic surfactants or complex substances thereof. The image bearing member protecting agent of the present invention should particularly and preferably be a nonionic surfactant, as the image bearing member protecting agent of the present invention forms a protection layer on the image bearing member, the formed layer needs to go through the image forming process, and the image bearing member protecting agent needs to have no adverse affect on the electrical characteristic of the image bearing member.

Using a nonionic surfactant for the amphiphile organic compound can prevent ion dissociation of the surfactant and can enable keeping high image quality by suppressing charge leaks caused by an aerial discharge, even when operation conditions thereof and/or, particularly, humidity change greatly.

The nonionic surfactant should preferably be an esterified compound, represented by the following structural formula (1), and combined with an alkylcarboxylic acid and a polyalcohol. Using this type of the nonionic surfactant can provide stable phase dissolved conditions with hydrophobic organic compounds, and provide stable conditions of the conditions after dispersion and of partially dissolved conditions, and can enable producing the image bearing member protecting agent having uniform quality over the products.

$$C_nH_{2n+1}COOH \quad (1)$$

Where "n" represents an integer in the range of 15 to 35, and the value n should preferably be in the range of 16 to 25.

When the value "n" (the number of carbon atoms) is less than 15, enough hydrophobitic property may not be obtained on the surface, causing grainy images and/or distorted images accompanied by latent image charge leaks under a high-temperature/high-humidity condition. When the value "n" is more than 35, the crystallinity of the material increases, and materials may be partially crystallized during the image bearing member protecting agent forming process, causing reduction of the density uniformity and making uniform coating layer difficult to be produced, and thus coating failures and uneven images may be caused.

Examples of the alkylcarboxylic acids represented with above structural formula (1) are normal palmitic acid (15), normal oleomargarine acid (16), normal stearic acid (17), normal arachidic acid (19), normal behenic acid (21), normal lignoceric acid (13), normal cerinic acid (25), normal montanic acid (27), normal melissic acid (29), isostearic acid (17), and substituted species thereof. These acids can be used separately or with others.

Using a long-chain-alkylcarboxylic-acid for the alkylcarboxylic acid represented with above structural formula (1) makes the hydrophobitic parts of amphiphile organic compound easily arranged on the surface of the image bearing member, amphiphile organic compound is absorbed thereon, and provides high adsorption density for the surface of the image bearing member. Whereby, a preferable condition can be obtained.

The number of sites of alkylcarboxylic of a molecule of esterified compounds of the alkylcarboxylic represents hydrophobic property, and higher number of the sites will be more effective on preventing dissociation substance generated from air discharge from adhering to the surface of the image bearing member and minimizing the electrical stress on the surface of the image bearing member in the charging area. When the proportion of alkylcarboxylate esters is too large, however, polyalcohol parts having hydrophilicity will be covered by them, and, depending on the surface condition of the image bearing member, enough adsorption will not be obtained.

Thus, the average number of ester bindings per one molecule of the amphiphile organic compound should preferably be in the range of 1 to 3. The average number of ester binding per one molecule of the amphiphile organic compound can be adjusted by mixing selected one or more amphiphile organic compounds having different ester bindings.

Choices of an esterified compound of the alkylcarboxylate are not limited and one can be chosen in accordance with necessity. Examples are glyceryl alkylcarboxylates or displacements thereof which include glyceryl monostearate, glyceryl distearate, glyceryl monopalmitate, glyceryl dilaurate, glyceryl trilaurate, glyceryl dipalmitate, glyceryl trippalmitate, glyceryl dimyristate, glyceryl trimyristate, glyceryl palmitate, ester of glyceryl and monoarachidic acid, ester of glyceryl and diarachidic acid, glyceryl monobehenate, glyceryl, glyceryl, ester of glyceryl and monomontanic acid, glyceryl monomelissicate; and, sorbitan alkylcarboxylates or substituted species thereof which include sorbitan monostearate, sorbitan tristearate, sorbitan monopalmitate, sorbitan dipalmitate, sorbitan tripalmitate, sorbitan dimyristate, sorbitan trimyristate, sorbitan, ester of sorbitan and monoarachidic acid, ester of sorbitan and diarachidic acid, sorbitan monobehenate, sorbitan, sorbitan, ester of sorbitan and monomontanic acid, sorbitan monomelissicate.

Another example of an esterified compound of the alkylcarboxylate is one using an unsaturated aliphatic carboxylic acid, however, its unsaturated linkage tends to oxidize naturally in the air, resulting in changes in its nature and heat generation, and thus using the unsaturated aliphatic carboxylic acid for the esterified compound of the alkylcarboxylate is not preferable.

Moreover, steric barrier of the alkyl chain of an alkylcarboxylate having branched structure may make adsorption density insufficient when the protecting agent adsorbs on the surface of the image bearing member. Thus, the alkylcarboxylate should preferably be a long-chain alkylcarboxylic acid.

Having the amphiphile organic compound contain both an adsorption function to the surface of the image bearing member and a hydrophobizing function, hydorphobizing through absorbing deteriorated protecting agent components, is fundamental. For having the neighboring amphiphile organic compound and the deteriorated protecting agent components, deteriorated from electrical stresses, form into inverted-micelle-like forms, adjusting hydrophile-lipophile balance (HLB) value to an adequate value is crucial, and the value should preferably be in the range of 1.0 to 6.5. Adjusting the value in that range is particularly preferable as, when the value is in that range, a more desirable and stabilized condition against humidity can be provided.

Herein, a HLB value represents a balance between hydrophile and lipophile, particularly of water-insoluble organic compounds, of a surfactant. A higher HLB value means a higher affinity for water. The HLB value can be calculated with following Kawakami's equation.

$$HLB=7+11.7\times\log(Mw/Mo)$$

Where Mw represents molecular weight of hydrophilic groups and Mo represents molecular weight of lipophilic groups. And where "log" represents common logarithm.

In the present invention, the mass ratio of the mixture of the hydrophobic organic compound (A) and amphiphile organic compound (B), or represented as (A)/(B) herein, should preferably be in the range of 10/90 to 97/3, more preferably 20/80 to 90/10. Contamination of a charge member can be sufficiently suppressed and enough protection effect can be obtained by adjusting the ration in these ranges.

The total content of hydrophobic organic compounds and amphiphile organic compounds should preferably be in the range of 75% by mass to 100% by mass of total mass of the image bearing member protecting agent, and more preferably 85% by mass to 100% by mass. Contamination of a charge member can be sufficiently suppressed and enough protection effect can be obtained by adjusting the total content in these ranges. When the total content is less than 75% by mass, components other than hydrophobic organic compounds/amphiphile organic compounds can be formed in cluster shapes and can occupy large area at the protection layer formed on the surface of the image bearing member, preventing forming a uniform protection layer. In this condition, protection property unevenness will occur, unevenness caused by heterogeneity of the image bearing member protecting agent components, causing partial deterioration on the image bearing member and reducing the life period thereof.

For the image bearing member protecting agent of the present invention, in order to sufficiently control protecting agent consumption and to improve formability thereof, filling agents may be added thereto.

The image bearing member protecting agent is located near the image bearing member contained in the image forming apparatus, therefore, during a continuous operation, the protecting agent will be frequently exposed to the environment, wherein the temperature thereof is increased to a level above room temperature due to heat from heat sources such as drive systems. Thus, in order to maintain the shape of the protecting agent during the operation, phase changes, such as melting, of the protecting agent should be avoided under a certain degree of high temperature.

At the same time, in order to ensure protection effect on the image bearing member against electrical stresses, a protection layer should preferably be formed on the surface of the image bearing member through stretching the image bearing member protecting agent supplied thereon, and in order to do so, the intermolecular interaction force of the protecting agent component should not be excessively strong.

Excessive intermolecular interaction force can require large amount of energy for changing intraphase structure once after the structure is settled, increasing endothermic peak temperatures that can be measured with a differential thermal analyzer. Thus, in order to maintain the shape of the image bearing member protecting agent while keeping stretching property during protection layer forming, the image bearing member protecting agent should preferably have at least one endothermic peak temperature between 50° C. and 130° C., and more preferably 50° C. and 120° C.

A complete dissolution condition of the hydrophobic organic compound and the amphiphile organic compound in the image bearing member protecting agent may prevent deteriorated component of the image bearing member protecting agent from being taken into the amphiphile organic compound, therefore, hydrophobic organic compound should be in a dispersed condition or in a condition partly dissolved into the amphiphile organic compound or vice versa. Desirable dispersed or partly dissolved condition of the compounds can be obtained from different solidification temperatures of the hydrophobic organic compound and of the amphiphile organic compound, or in other words, through making the difference of endothermic peak temperatures of each compound larger. Thus, the image bearing member protecting agent should preferably have at least one endothermic peak temperature at the range of 40° C. to 70° C. and 80° C. to 130° C. respectively.

Herein, the endothermic peak temperature represents a temperature of the peak position of the temperature-rising differential thermal profile measured using a differential thermal analyzer.

(Production Method of Image Bearing Member Protecting Agent)

The production method for the image bearing member protecting agent of the resent invention is to produce the above-stated image bearing member protecting agent. The production method can employ known solid material forming methods for producing and forming the image baring member protecting agent into a specific shape, such as prismatic shape and columnar shape, and examples of the solid material forming methods include a melt molding, a powder molding, a heat-press molding and a hot isostatic press. For these forming methods, the melt molding is particularly preferable.

Through the melt molding method, a molded article of the image bearing member protecting agent can be obtained by following steps: melt the image bearing member of the present invention by giving heat a temperature above its melting point, pour a specific amount of image bearing member protecting agent thus molten into a specific shape metal-mold, keep the image bearing member protecting agent at a temperature lower than its melting point for a certain period of time upon necessity, and then cool or cool naturally the image bearing member protecting agent. In order to remove internal strain of the image bearing member obtained thereby, the image bearing member protecting agent of the present invention may further be slowly reheated to its phase transition temperature after the image bearing member protecting agent has been reached a temperature equal to or below its phase transition point during the cooling step.

The image bearing member protecting agent is then cooled near room temperature and separated from the metal mold, and the shape of the image bearing member thus obtained may be adjusted through a cutting process.

The term "phase transition" of the phase transition temperature of the image bearing member protecting agent of the present invention refers to structural phase transition, wherein the structure of substances, or status of the structure (i.e. phase) transform, or transit, to another structure upon an external condition.

The external condition includes temperature, pressure, magnetic field and electric field. And particularly, the phase transition temperature at the present invention represents the temperature thereat the phase transition of the image bearing member protecting agent occurs. The phase transition includes phase transitions between a gas phase and a liquid phase and a solid phase, and further includes structure transition wherein crystal structure changes into another structure having a different symmetry property in solid phase, and crystalline solid phase changes into a amorphous solid phase or a change in an opposite way.

Because changes in endothermic ratio and specific heat occur at temperatures near the complete solid phase transition point, the phase transition temperature can be measured based on onset temperatures (or extrapolation starting temperatures) of a differential thermal profile measured with a differential thermal analyzer, and changes on the slope of the profile (or the profile of first derivation of temperatures).

The phase transition temperature of the image bearing member should preferably be in the range of 35° C. to 90° C., and more preferably 45° C. to 70° C.

The metal mold should preferably be made of steel, stainless steel or aluminum from the viewpoint of desirable thermal conductivity and dimensional accuracy. The internal surface of the metal mold should preferably be coated with a releasing agent, such as fluorine resins or silicone resins so that the formed image bearing member protecting agent can be separated easily from the metal mold.

(Protection Layer Forming Apparatus)

The protection layer forming apparatus of the present invention contains at least a protection layer forming unit wherein a protection layer is formed on the surface of the image bearing member through supplying the image bearing member protecting agent of the present invention, the protecting agent is supplied on the surface of the image bearing member, and other units can be included in the protection layer forming apparatus in accordance with necessity.

The protection layer forming unit comprises a suppress pressure application member pressing and applying the image bearing member protecting agent on a protecting agent supply member, the protecting agent supply member supplying the image bearing member protecting agent on the surface of the image bearing member and a protection layer forming member thinning the image bearing member protecting agent thereby supplied and forming a protection layer therewith, and other members can be included in the protection layer forming unit.

The protection layer forming member can also work as a cleaning member when the protection layer forming member is contained in the protection layer forming apparatus, however, for ensuring protection layer forming, using a cleaning member for removing remaining substances, consisting mainly of toner, on the image bearing member and preventing the remaining substances from being mixed into the protection layer are preferable.

FIG. 1 is a schematic illustration of an example of the protection layer forming apparatus of the present invention.

An image forming apparatus placed facing a photoconductor drum 1, or a image bearing member, includes an image bearing member protecting agent 21 of the present invention, a protecting agent supply member 22, a suppress pressure application member 23, a protection layer forming member 24 and others.

The image bearing member protecting agent 21 of the present invention is given suppress pressure applied using the suppress pressure application member 23 and touches the brush-like protecting agent supply member 22. The protecting agent supply member 22, having linear velocity different of the rotation speed of the image bearing member 1, rotates and grazes the image bearing member 1, supplying the image bearing member protecting agent, which is held on the surface of the protecting agent supply member, on the surface of the image bearing member.

While the image bearing member protecting agent is supplied on the surface of the image bearing member, the protecting agent supplied thereon may sometimes not form sufficient protection layer depending on types of substances used. Thus, to form a more uniform protection layer, the protection layer forming member having blade-like part can be used for making the layer thinner and forming the layer.

The image bearing member having the protection layer surface thereon can be charged by, for example, having the charging roller 3 on which direct current or direct current superimposed with alternate current supplied from a high-voltage generator not shown in the drawing contact or approach to the surface and have the charging roller 3 discharge electricity in the minute gap between the charging roller 3 and the image bearing member. During this process, decomposition and oxidization caused by electrical stress can occur in some areas of the protection layer, producing decomposed and oxidized products, and air discharge products can adhere on the surface of the protection layer. Generally, these decomposed products, oxidized products and air-discharge products of the protection layer are hydrophilicity or containing hydrophilic group.

The composition of the image bearing member protecting agent of the present invention includes both an amphiphile organic compound having a hydrophilic part and a hydrophobic part in a molecule thereof and a hydrophobic organic compound. Thus, hydrophilized areas of the surface of the surface of the image bearing member generated from electrical stress can be hydrophobized by having amphiphile organic compounds adsorb in hydrophilized areas, and surrounding hydrophobic organic compounds can prevent electrical stress from directly applying on the surface of he image bearing member. Instead, some areas of the image bearing member protecting agent deteriorated and hydrophilized from being exposed to electrical stress can be formed into inverted micelle-like forms employing a surplus amphiphile organic compound having an adequate HLB value and dispersed into the hydrophilic organic compound. Thereby, a protection layer having an excellent balance between protection effect for the image bearing member and removal performance of deteriorated image bearing member protecting agents can be achieved.

The deteriorated image bearing member protecting agent, as well as toner particles and other components, remaining on the surface of the image bearing member, can be removed with a cleaning mechanism. The cleaning mechanism can be combined with the protection layer forming member, however, adequate friction requirement for removing remaining components on the surface of the image bearing member may not be the same as that for forming protection layer, thus the cleaning function should preferably be separated of the protection layer forming member. As shown in FIG. 1, a cleaning mechanism 4 which includes a cleaning member 41 and a cleaning suppress pressure mechanism 41 should preferably be placed at the upstream position to the rotate direction of the image bearing member.

Materials for the blade employed in the protection layer forming member are not limited and suitable one or more can be selected from known materials for a cleaning blade. Examples of materials are urethane rubber, hydrin rubber, silicone rubber and fluororubber. These materials can be used alone or in combination. The contact part, the part contacting with the image bearing member, of the blade can be coated or impregnated with materials having low-friction coefficients.

Furthermore, filling agents, such as organic fillers and inorganic fillers can be dispersed in elastic body to control its elasticity.

The above-mentioned cleaning blade is fixed on the blade supporting body using an arbitrary fixing method such as adhesive bonding or fusion bonding, so that the tip of the blade is in pressured touching condition with the surface of the image bearing member. The thickness of the blade is determined in accordance with the applying pressure, and thus conditions including the thickness should be taken into account, but the thickness should preferably be in the range of from 0.5 mm to 5 mm, more preferably 1 mm to 3 mm.

The length of the cleaning blade part exerted from the supporting body, the length of which the cleaning blade can have flexure, or a so-called free length, is also determined in accordance with applying pressure so conditions should be taken into account, but the thickness should preferably be in the range of from 1 mm to 15 mm, more preferably 2 mm to 10 mm.

Another example for the blade employed in the protection layer forming member is a coating-layer-covered resilient metal blade, the blade such as leaf metal, whose coating layer can be made of, for example, resins, rubbers or elastomers, having those material form thereon through coating or dipping method using coupling agent or primer component in accordance with necessity. Thermal hardening and/or surface policing will be given thereto upon necessity.

The coating layer contains at least a binder resin and a filling agent, and may contain other components in accordance with necessity.

Material for the binder resin is not limited, and can be chosen in accordance with purpose. Examples are fluorine resins, such as PFA, PTFE, FEP and PVdF, silicon elastomers, such as fluorine rubbers and methylphenyl silicone elastomers.

The thickness of the resilient metal blade should preferably be in the range of from 0.05 mm to 3 mm, and more preferably 0.1 mm to 1 mm. After the resilient metal blade is fixed, it can be treated with a bending process in the direction parallel to the spindle direction so that twist of the blade can be prevented.

Suppress pressure, the pressure given from the protection layer forming member and applied on the image bearing member, should be in a range of force large enough to draw the image bearing member protecting agent supplied thereon for forming a protection layer, and thus the pressure preferably be in the range of 5 gf/cm to 80 gf/cm, more preferably 10 gf/cm to 60 gf/cm in linear pressure.

A brush-shaped member can preferably be used for the protecting agent supply member. The fabric of the brush should preferably have flexibility so that mechanical stress on the surface of the image bearing member can be reduced. Fabrics can be used for brush material are not limited and suitable one ore more can be chosen in accordance with necessity. Examples of materials are polyolefin resins, such as polyethylenes and polypropylenes; polyvinyl resins or polyvinylidene resins, such as polystyrenes, acrylate resins, polyacrylonitriles, polyvinyl acetates, polyvinyl alcohols, polyvinyl butyrals, polyvinylchlorides, polyvinyl carbazoles, polyvinyl ethers and polyvinyl ketones; polyvinyl-chloride acetate copolymers; styrene-acrylic acid copolymers; styrene-butadiene resins; fluorine resins, such as polytetrafluoroethylenes, poly vinyl fluorides, poly vinylidene fluorides and polychlorotrifluoroethylenes; polyesters; nylons; acrylates; rayons; polyurethanes; polycarbonates and phenol resins; amino resins, such as urea-formaldehyde resins, melamine resins, benzoguanamine resins, urea resins and polyamide resins.

In order to adjust its flexibility, the brush fabric having flexibility can contain materials, such as diene rubbers, styrene-butadiene rubbers (SBR), ethylene-propylene rubbers, polyisoprene rubbers, nitrile rubbers, polyurethane rubbers, silicone rubbers, hydrin rubbers and norbornene rubbers.

The supporting body for the protecting agent supply member can be a fixed type or a revolvable roll type. An example a protecting agent supply member using the roll type supporting body is a roll brush wherein a pile fabric tape made of brush fabric is winded in a spiral configuration on a core metal supporting body. The fiber diameter of the brush fabric should be in the range of 10 μm to 500 μm, the brush length should be in the range of 1 mm to 15 mm, the brush density should be in the range of 10,000 fibers/$cm^2$ to 300,000 fibers/$cm^2$ ($1.5\times10^7$ to $4.5\times10^8$ fibers/1 $m^2$).

The protecting agent supply member should preferably have a high brush density from the view point of supply uniformity and supply stability. One fiber should preferably be made of fine fibers, in the range of from several fibers to hundreds fibers. A preferable example is a fiber made of 50 fine fibers of 6.7 decitex (6 denier), such as 333 decitex (30 denier) having 50 filament of 6.7 decitex (6 denier).

The brush fabric can be covered with a coating layer in order to stabilize surface shape and improve environmental stability of the brush. The component of the coating layer should preferably have flexibility in accordance with the flexibility of the brush fabric. Materials for the coating layer component are not limited as long as they have flexibility and material can be chosen in accordance with purpose. Examples are polyolefin resins, such as polyethylenes, polypropylenes, chlorinated polyethylenes and chlorosulfonated polyethylenes; polyvinyl resins or polyvinylidene resins, such as polystyrenes, acrylates (an example of acrylate is polymethylmethacrylate), polyacrylonitriles, polyvinyl acetates, polyvinyl alcohols, polyvinyl butyrals, polyvinylchlorides, polyvinyl carbazoles, polyvinyl ethers and polyvinyl ketones; polyvinyl-chloride acetate copolymers; silicon resins with organosiloxane binding or modifications of silicon resins, such modifications of asalkyd resins, polyester resins, epoxide resins and polyurethane resins; fluorine resins, such as perfluoroalkylethers, perfluorovinyls, perfluoro vinylidenes and polychlorotrifluoroethylenes; polyamides; polyesters; polyurethanes; polycarbonates; amino resins such as urea-formaldehyde resins; epoxide resins and complexes of these resins.

(Image Forming Method and Image Forming Apparatus)

The image forming method of the present invention includes at a least latent electrostatic image forming step, a developing step, a transferring step, a protection layer forming step and a fixing step, and preferably includes a cleaning step. And the image forming method further includes other steps suitably selected in accordance with the necessity, and examples of steps include a charge elimination step, a recycling step, and a controlling step.

The image forming apparatus of the present invention is provided with at least an image bearing member, a latent electrostatic image forming unit, a developing unit, a transferring unit, a protection layer forming apparatus and a fixing unit, and preferably provided with a cleaning unit. The image forming apparatus is further provided with other units suitably selected in accordance with the necessity, and examples of units include a charge elimination unit, a recycling unit, and a controlling unit.

The image forming method of the present invention is preferably processed with the image forming apparatus of the present invention, the above sited latent electrostatic image forming step is processed with above sited latent electrostatic image forming unit, the above-sited developing step is processed with the above-sited developing unit, the above-sited transferring step is processed with the above-sited developing unit, the above-sited protection layer forming step is processed with the above-sited protection layer forming apparatus, the above-sited fixing step is processed with the above-sited fixing unit, and the above-sited other step are processed with the above-sited other units.

<Latent Electrostatic Image Forming Step and Latent Electrostatic Image Forming Unit>

The above sited latent electrostatic image forming step is a step in which a latent electrostatic image is formed on an image bearing member.

—Image Bearing Member—

The image bearing member is not particularly limited as to the material, shape, structure, size, or the like, and may be suitably selected from among those known in the art. With respect to the shape of the photoconductor, drum-shaped one is preferably used. Preferred examples of the material include inorganic photoconductors made from amorphous silicon, selenium, or the like, and organic photoconductors made of polysilane, phthalopolymethine, or the like. The above sited image bearing member can be either a photoconductor or an intermediate transfer member.

The image bearing member (photoconductor) used in the image forming apparatus of the present invention contains at least a conductive support and a photoconductive layer thereon, and may contain further layers in accordance with necessity.

The above-sited photoconductive layer can be categorized into a single layer type wherein charge generation material and charge transport material are mixed, a sequence layer type wherein a charge generation layer is covered with a charge transport layer, and a reverse layer type wherein the charge transport layer is covered with the charge generation layer. A top surface layer can be formed on the photoconductive layer to increase durability of the above-sited photoconductor against mechanical stress, friction, gas and to improve cleaning property. A base layer can be contained between the photoconductive layer and the conductive support. An adequate amount of plasticizer, antioxidant and/or levelling agent can be contained in each layer in accordance with necessity.

Material for the above sited conductive support is not limited as long as it has conductivity of volume resistance $1.0\times10^{10}$ Ω·cm or under, and one can be chosen in accordance with necessity. Examples are file or cylinder shape plastic or paper covered with evaporated or sputtered metals such as aluminum, nickel, chrome, nichrome, copper, gold, silver and platinum or metal oxidizes such as tin oxide and indium oxide. Other examples are metal drum-shaped tubes, made of metals such as aluminum, nickel and stainless, formed by a solid-drawn process or extrusion process and processed through surface-treatments, such as cutting, surperfinishing and grinding.

The diameter of the drum-shaped support should preferably be in the range of from 20 mm to 150 mm, and more preferably 24 mm to 100 mm, and further preferably 28 mm to 70 mm. When the diameter of the drum-shaped support is smaller than 20 mm, arranging steps of charging, exposing, developing, transferring and cleaning around the drum may physically be difficult. When the diameter is larger than 150 mm, an image forming apparatus will be too large. Particularly when multiple photoconductors are needed to be contained in a multi-image forming apparatuses system, the diameter should preferably be smaller than 70 mm, more preferably smaller than 60 mm. The endless nickel belt according to JP-A No. 52-36016, or an endless stainless belt can be used as a conductive support.

The basic layer contained in the above-sited photoconductor can be a single layer or multiple layers. Examples are one mainly made of resin, one mainly made of white pigment and resin, and a conductive-base based oxidized metal film wherein the surface of the conductive-base is oxidized chemically or electro chemically. Of these layers, the one mainly comprising white pigment and resin is preferable.

Examples of the white pigment mentioned above are oxidized metals, such as titanic oxide, oxidized aluminum, oxidized zirconium and zinc oxide. And of these metals, titanic oxide that has excellent property on charge injection prevention is particularly preferable.

Examples of the resin mentioned above are thermoplastic resins such as polyamide, polyvinyl alcohol, casein and methylcellulose and thermosetting resins, such as acrylic, phenol, melamine, alkyd, unsaturated polyester and epoxy resins. These materials can be used alone or in combination.

Thickness of the above-sited base layer is not particularly limited and can be decided in accordance with necessity. The thickness should preferably be in the range of 0.1 μm to 10 μm, and more preferably 1 μm to 5 μm.

Examples of the charge generation material of the above-sited photoconductive layer are azo pigments, such as monoazo pigment, bisazo pigment, trisazo pigment, tetrakisazo pigment; organic pigments or organic dyes, such as triarylmethan dye, thiazine dye, oxazine dye, xanthene dye, cyanin pigment, styryl pigment, pyrylium pigment, quinacridone pigment, indigo pigment, heterocyclic quinone pigment, bisbenzimidazole pigment, indathron pigment, squarylium pigment and phthalocyanine pigment; inorganic materials such as selenium, selenium-arsenic, selenium-tellurium, cadmium sulfide, zinc oxide, titanic oxide and amorphous silicon. These materials can be used alone or mixed in combination.

Examples of charge transport materials of the above-sited photoconductive layer are anthracene derivative, pyrene derivative, carbazole derivative, tetrazole derivative, metallocene derivative, phenothiazine derivative, pyrazoline compound, hydrazone compound, styryl compound, styrylhydrazone compound, enamine compound, butadiene compound, distyryl compound, oxazole compound, oxadiazole compound, diazole compound, triphenylamine derivative, imidazole compound, phenylenediamine derivative, aminostilbene derivative, triphenylmethane derivative. These materials can be used alone or in combination.

A binder resin used for forming the above-stated photoconductive layer has electrical insulating properties. Materials for the binder resin can be chosen from known materials, such as thermoplastic resin, thermosetting resin, light cure resin and photoconductive resin. Examples of the binder resin include thermoplastic resins such as polyvinylchloride, polyvinylidene chloride, polyvinyl-chloride acetate copolymer, vinyl chloride-co-vinyl acetate-co-maleic anhydride copolymer, ethylene-vinyl acetate copolymer, polyvinyl butyral, polyvinyl acetal, polyester, phenoxy resin, (meta-) acrylate resin, polystyrene, polycarbonate, polyarylate, polysulphone, polyether sulfone and acrylonitrile butadiene styrene; thermosetting resins, such as phenol resins, epoxide resin, polyurethane resin, melamine resin, isocyanate resin, alkyd resin, silicon resin and thermosetting acryl resin; polyvinyl carbazole; polyvinyl anthracene and polyvinyl pyrene. These materials can be used alone or in combination.

Examples for the above-stated antioxidant are phenol compounds, p-phenylenediamines, hydroquinone, organic sulfur compounds and organic phosphorus compounds.

Examples of above-stated phenol compounds are 2,6-Di-tert-butyl-p-cresol, butylated hydroxyanisole, 2,6-Di-tert-butyl-4-ethylphenol, stearyl-β-(3,5-di-t-butyl-4-hydroxyphenyl)propionate, 2,2'-methylene-Bis-(4-methyl-6-tert-butylphenol), 2,2'-methylene-Bis-(4-ethyl-6-tert-butylphenol), 4,4'-thiobis-(3-methyl-6-tert-butylphenol), 4,4-butylidene Bis-(3-methyl-6-tert-butylphenol), 1,1,3-tris-(2-methyl-4-hydroxy-5-tert-butylphenyl)butane, 1,3,5-torimethyl-2,4,6-tris-(3,5-Di-tert-butyl-4-hydroxybenzyl)benzol, tetrakis-[methylene-3-(3',5'-Di-tert-butyl-4'-hydroxyphenyl) propionate]methane, Bis[3,3'-bis(4'-hydroxy-3'-tert-butylphenyl) butyric acid]glycol ester and tocopherols.

Examples of above-stated p-phenylenediamines compounds are N-phenyl-N'isopropyl-p -phenylenediamine, N,N'Di-sec-butyl-p-phenylenediamine, N-phenyl-N-sec-butyl-p-phenylenediamine, N,N'Di-isopropyl-p-phenylenediamine, and N,N'dimethyl-N,N'Di-tert-butyl-p-phenylenediamine.

Examples of above stated hydroquinone compounds are 2,5-Di-tert-octylhydroquinone, 2,6-Di-dodecyl hydroquinone, 2-dodecyl hydroquinone, 2-dodecyl-5-chlorohydroquinone and 2-tert-octyl-5-methyl hydroquinone, 2-(2-octadecenyl)-5-methyl hydroquinone.

Examples of above stated organic sulfur compounds are dilauryl-3,3'thiodipropionate, distearyl-3,3'thiodipropionate and ditetradecyl-3,3'thiodipropionate.

Examples of above stated organic phosphorus compound are triphenylphosphorous, tri(nonylphenyl)phosphorus, tri (dinonylphenyl)phosphorus, tricresyl phosphorus and tri(2, 4-butylphenoxy)phosphorus.

These compounds are commonly known as antioxidants for rubbers, plastics, greases and others, and can be easily acquired. The content of an antioxidant should be in the range of from 0.1% by mass to 10% by mass to the total mass of the layer in which the antioxidant is contained.

Generally used resin plasticizers, such as dibutyl-phthalate and dioctylphthalate, can be used for the above-stated plasticizer, and the used amount thereof should be in the range of 0 part by mass to 30 parts by mass per 100 parts by mass of a binder resin.

A leveling agent can be added into the above-stated photoconductive layer. Examples of the leveling agent are silicone oils such as dimethyl silicon oil and methylphenyl silicon oil and polymers or oligomers having perfluoroalkyl at side chains thereof. The used amount of the agent should preferably be in the range of 0 part by mass to 1 part by mass per 100 parts by mass of the binder resin.

The top surface layer of the above-stated photoconductor are provided for improving mechanical strength, abrasion resistance, gas resistance, cleaning property and the like of the photoconductor. Polymers or polymers into which inorganic filler is dispersed having higher mechanical strength than the photoconductive layer are preferable examples for the top surface layer. Furthermore, either thermoplastic resins or thermosetting resins can be used for the resin used for the above-stated top surface layer; however, the thermosetting resins are particularly preferable because of their higher mechanical strength and extremely high abrasion preventing effect on suppressing abrasion caused by friction between the photoconductor and the cleaning blade. When the top surface layer formed is thin, not containing charge transport capacity therein will not cause problems; however, when the top surface layer formed having no charge transport capacity is thick, photoconductor sensitivity reduction, residual potential increase after exposure and residual potential increase may easily be occurred, and thus containing the above-stated charge transport substances in the top surface layer and/or using polymers used for the top surface layer and having charge transport capacity are preferable.

As mechanical strength of the above-stated photoconductive layer generally differ greatly from that of the top surface layer, and as abrasion and disappearance of the top surface layer, the abrasion and the disappearance caused by frictions generated from the cleaning blade, cause immediate abrasion of the photoconductive layer, placing the layer having an enough and adequate thickness is crucial. The thickness should preferably be in the range of 0.1 μm to 12 μm, more preferably 1 μm to 10 μm, further preferably 2 μm to 8 μm. If the thickness is less than 0.1 μm, the thickness of the top surface layer is too thin so that friction with the cleaning blade can easily cause disappearance of the layer, and disappearance will then cause abrasion of photoconductive layer. When the thickness is more than 12 μm, the layer is too thick so that the layer may cause sensitivity reduction, increasing a potential after exposure and a residual potential. Particularly, when polymers having charge transport capacity is used, the polymers having charge transport capacity will cause cost increase.

Resins used for the above stated top surface layer should preferably be transparent for image forming light and have insulation property, good mechanical strength and good adhesion property. Examples thereof are ABS resin, ACS resin, olefin-vinylmonomer copolymer, chlorinated polyether, allyl resin, phenol resin, polyacetal, polyamide, polyamide-imide, poly acrylirete. polyarylsulfone, polybutylene, polybutylene terephthalate, polycarbonate, polyether sulfone, polyethylene, polyethylene terephthalate, polyimide, acrylate resin, polymethyl pentene, polypropylene, polyphenylene oxide, polysulfone, polystyrene, AS resin, butadiene-styrene copolymer, polyurethane, polyvinylchloride, polyvinylidene chloride, epoxy resin. These polymers can be thermoplastic resin, but in order to enhance the mechanical strength of polymers, they can be cross-linked with cross-linked agents having polyfunctional acrylyl groups, carboxyl groups, hydroxyl groups, amino groups, so that they become thermosetting resins which can bring enhanced mechanical strength of the top surface layer and greatly reduce abrasion caused by frictions of the cleaning blade.

The top surface layer should preferably have charge transport capacity. Methods for having the top surface layer have charge transport capacity are one using polymers, which are used in the top surface layer, mixed with charge transport substances, and one using polymers having charge transport capacity in the top surface layer is more preferable. The later method can make a photoconductor having higher sensitivity and fewer occurrences of residual potential increase after exposure and residual potential increase.

A preferable example of the polymers having the above-stated charge transport capacity is one having groups having charge transport capacity in the polymer, groups represented by the following structural formula (i).

Structural Formula (i)

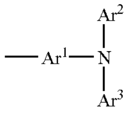

Where $Ar^1$ represents an arylene group which may be substituents. $Ar^2$ and $Ar^3$ represent aryl groups which may be identical or different, and may contain substituents.

Such type of groups having charge transport capacity should preferably be attached to side chains of polymers having high mechanical strength, polymers such as polycarbonate resins and acrylate resins. Using acrylate resins, whose monomers are easily obtained which and have good sclerogenic and coating property, is more preferable.

Such acrylate resin having charge transport capacity and containing unsaturated carboxylic acids, the carboxylic acids having a group represented by the above structural formula and polymerized to the acrylate resin, can form a surface layer with excellent mechanical strength, transparency and charge transport capacity. Mixing a polyfunctional unsaturated carboxylic acid, preferably an unsaturated carboxylic acid having trifunctions or higher functions, into a monofunctional unsaturated carboxylic acid having a group represented in the above stated structural formula (i) can obtain an acrylate resin forming cross-linked structures therein and can be a thermosetting polymer, and thus the acrylate resin can form surface layer with significantly high mechanical strength. The polyfunctional unsaturated carboxylic acid can contain the group represented in the above structural formula (i), however, in terms of monomer production cost, the polyfunctional unsaturated carboxylic acid should preferably contain light-sclerogenic polyfunctional monomer in stead of the group of the above structural formula (i).

Examples of monofunctional unsaturated carboxylic acids having a group represented in the above stated structural formula (i) are shown in the following structural formula (ii) and structural formula (iii).

Structural Formula (ii)

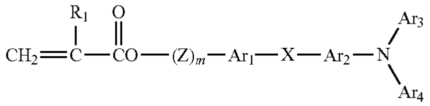

Structural Formula (iii)

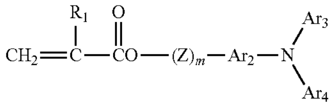

In the above stated structural formula (ii) and the structural formula (iii), $R_1$ represents an alkyl group which may contain hydrogen atom(s), halogen atom(s), substituents (s); an aralkyl group which may contain substituents(s); an aryl group which may contain substituents (s); an alkoxy group which may contain cyano group(s) nitro group, substituents; —$COOR_7$ ($R_7$ represents an alkyl group which may contain hydrogen atom, substituents; an aralkyl group which may contain substituents; an aryl group which may contain substituents); halogenated carbonyl group or $CONR_8R_9$($R_8$ and $R_9$ can be the same or different and which represent an alkyl group which may contain hydrogen atom, halogen atom, substituents, an aralkyl group which may contain substituents or an aryl group which may contain substituents).

In the above stated structural formula (ii) and the structural formula (iii), $Ar_1$ and $Ar_2$ can be the same or different and which represent an arylene group which may contain substituents.

In the above stated structural formula (ii) and the structural formula (iii), $Ar_3$ and $Ar_4$ can be the same or different and which represent an aryl group which may contain substituents.

In the above stated structural formula (ii) and the structural formula (iii), X represents an alkylene group which may contain single bond, substituents, a cycloalkylene group which may contain substituent groups, or an alkylene ether group, an oxygen atom, a sulfur atom or a vinylene group, which may contain substituents.

In the above stated structural formula (ii) and the structural formula (iii), Z represents an alkylene group which may contain substituents, a bivalent alkylene ether group which may contain substituents, or an alkyleneoxycarbonyl-bivalent-group which may contain substituents.

And "m" and "n" represents an integer number in the range of 0 to 3 respectively.

Examples of alkyl groups for substituentss of $R_1$ in the above-stated structural formula (ii) and structural formula (iii) are methyl group, ethyl group, propyl group and butyl group. Examples of aryl groups are phenyl group and naphthyl group. Examples of aralkyl groups are benzyl group, phenethyl group and naphthylmethyl group. Examples of alkoxy groups are methoxy group, ethoxy group and propoxy group. They can be substituted by a halogen atom; a nitro group; cyano group; an alkyl group such as methyl group and ethyl group; an alkoxy group such as methoxy group and ethoxy group; an aryloxy group such as phenoxy group; a aryl group such as phenyl group and naphthyl group; an aralkyl group such as benzyl group and phenethyl group. Of these substituents for $R_1$, hydrogen atom and methyl group are particularly preferable.

Examples of aryl groups for the above stated $Ar_3$ and $Ar_4$ are condensed polycyclic hydrocarbon groups, non-condensed polycyclic hydrocarbon groups and heterocyclic groups.

The condensed polycyclic hydrocarbon groups should have less than 18 chain forming carbon atoms. Examples thereof are pentanyl group, indenyl group, naphthyl group, azulenyl group, heptalenyl group, biphenylenyl group, as-indacenyl group, s-indacenyl group, fluorenyl group, acenaphthylenyl group, praadenyl group, acenaphthenyl group, phenalenyl group, phenanthryl group, anthryl group, fluoranethenyl group, acephenanthryl lenyl group, aceanthryl lenyl group, triphenylel group, pyrenyl group, crysenile group and naphthasenile group.

Examples of the above stated non-condensed polycyclic hydrocarbon groups are monocyclic hydrocarbon compounds of monovalent group, monocyclic hydrocarbon compounds such as benzene, diphenyl ether, polyethylene diphenylether, diphenylthioether and diphenyl sulfone; non-condensed polycyclic hydrocarbon compounds of monovalent group, cyclic hydrocarbon compounds such as biphenyl, polyphenyl, diphenylalkane, diphenylalkene, diphenylalkyne, triphenylmethane, distyrylbenzene, 1,1-diphenyl cycloalkane, polyphenylalkane and polyphenylalkene and cyclic hydrocarbon compounds of monovalent group, such as 9,9-diphenylflorene.

Examples of the above stated heterocyclic groups are monovalent groups, such as carbazole, dibenzofuran, dibenzothiophene, oxadiazole and thiadiazole.

The content of the above-stated polyfunctional unsaturated carboxylic acid in the entire area of the above stated top surface layer should preferably be in the range of 5% by mass to 75% by mass, more preferably 10% by mass to 70% by mass, further preferably 20% by mass to 60% by mass. When the content is less than 5% by mass, mechanical strength of the top surface layer will be insufficient, and when more than 75% by mass, cracks will tend to be produced on the top surface layer when a strong force applied thereon, and sensitivity degradations may tend to be occurred.

When using an acrylate resin for a top surface layer, the surface layer can be formed through a radical polymerization induced from exposure to an electron irradiation or an activator ray such as ultraviolet to the above-stated unsaturated carboxylic acid coated on the photoconductor. An unsaturated carboxylic acid in which photopolymerization initiator is dissolved is used for a radical polymerization with activator ray. Materials for the photopolymerization initiator are not limited and adequate materials can be selected from those generally used for light sclerogenic coating.

The above-stated top surface layer should preferably have metal fine particles, metal oxide fine particles and other fine particles therein in order to enhance the mechanical strength of the top surface layer. Examples of the metal oxides are titanic oxide, tin oxide, potassium titanate, TiO, TiN, zinc oxide, indium oxide, and antimony oxide. Examples of other fine particles that can enhance abrasion-resistance are fluorine resins such as polytetrafluoroethylene, silicone resins and resins in which inorganic materials are dispersed.

A latent electrostatic image can be formed, for example, by charging the surface of the above-stated image bearing member uniformly and then exposing the surface thereof imagewisely by means of the above-stated latent electrostatic image forming unit. The latent electrostatic image forming unit is provided with, for example, at least a charger configured to uniformly charge the surface of the photoconductor, and an exposer configured to expose the surface of the image bearing member imagewisely.

The surface of the photoconductor can be charged by applying a voltage to the surface of the image bearing member through the use of, for example, the above-stated charger.

The charger is not particularly limited, may be suitably selected in accordance with the intended use, and examples thereof include contact chargers known in the art, for example, which are equipped with a conductive or semiconductive roller, a brush, a film, a rubber blade or the like, and non-contact chargers utilizing corona discharging. Examples of non-contact charges include corotoron and scorotoron.

A charger having a voltage imposing unit which imposes voltage having an alternate current component should preferably be used.

The surface of the photoconductor can be exposed, for example, by exposing the surface of the image bearing member imagewisely using the above-stated exposer.

The exposer is not particularly limited, provided that the surface of the image bearing member charged by the charger can be exposed imagewisely, and can be suitably selected in accordance with the intended use. Examples thereof include exposers such as reproducing optical systems, rod lens array systems, laser optical systems, and liquid crystal shutter optical systems. In the present invention, a back light method can be employed in which exposing is performed imagewisely from the back side of the image bearing member.

<Developing Step and Developing Unit>

The above-stated developing step is a step wherein a latent electrostatic image is developed using a developer and a toner to form a visible image.

The visible image can be formed by developing the latent electrostatic image using, for example, the developer and the toner. The visible image can be formed through the above-stated developing step.

The developing unit is not particularly limited, as long as a latent electrostatic image can be developed using the developer and the toner, and can be suitably selected from those known in the art. Preferred examples thereof include the one having at least an image developing apparatus which houses the developer of the present invention therein and enables supplying the developer to the latent electrostatic image in a contact or a non-contact state.

—Toner—

An average degree of circularity, the average value of circularity degree-SR represented by the following Equation 1, of the above stated toner should preferably be in the range of 0.93 to 1.00, and more preferably in the range of 0.95 to 0.99. The average degree of circularity indicates the degree of the unevenness of the shape of toner particles. When toner particles are in perfect globular shape the value of the average degree of circularity is 1.00, and when toner particles have more complicated surface shapes, the value becomes smaller.

<Equation 1>

Circularity degree SR=(The circumference length of a circle having the same area as the projected area of a toner particle)/(The circumference length of the projected area of the toner particle)

When the average degree of circularity is in the range of 0.93 to 1.00, the surface of the toner particles is even, and contact areas between toner particles and between a toner particle and the photoconductor are small, and thus high transfer efficiency can be obtained. Furthermore, abnormal images will not be generated because of toner particles having no edges, the particles need less agitation torque for agitating the developer in the developing unit, and less agitation torque stabilizes agitation vibration. Moreover, the toner, the toner for forming dots and having no toner particles having edges, suppresses the occurrences of toner particles not transferred as a pressure is uniformly applied to the entire toner when the pressure is applied on the toner to be transferred onto a recording medium. And the toner having particles with no edges and with small polishing effect can reduce the abrasion and flaws of the surface of the image bearing member.

The above-stated circularity degree SR can be measured with, for example, Flow Particle Image Analyzer (FPIA-1000, manufactured by SYSMEX CORPORATION).

A surface active surfactant (preferably alkylbenzene sulfonate) is added in an amount of 0.1 ml to 0.5 ml as a dispersant to 100 ml to 150 ml of water, from which solid impurities are removed in advance, contained in a container. And then a measurement sample is added in an amount of 0.1 g to 0.5 g. The sample-dispersed suspension liquid is treated with a dispersion treatment using an ultrasonic distributor for 1 minute to 3 minutes and then the shape and granularity of toner is measured with the above-stated analyzer while setting the concentration of the dispersed liquid at in the range of from 3,000 particles/μl to 10,000 particles/μl.

The mass average particle diameter (D4) of the above-stated toner should preferably be in the range of 3 μm to 10 μm, and more preferably 4 μm to 8 μm. In these ranges, excellent dot reproducibility can be obtained because the toner has toner particles whose particle diameter is small enough relative to fine latent-image-dots. When the mass average particle diameter (D4) is smaller than 3 μm, reduction of transfer efficiency and blade cleaning property can occur, and when larger than 10 μm, suppression of dispersion of letters and lines can be difficult.

Furthermore, the ratio of the mass average particle diameter (D4) to the number-average particle diameter (D1), or D4:D1, of the above-stated toner should preferably be in the range of 1.00 to 1.40, and more preferably 1.00 to 1.30. The ratio of D4:D1 closer to 1.00 means the particle size distribution of the toner becomes more clumped, and when (D4:D1) is in the range of 1.00 to 1.40, because development of toner particles based on particle diameters will not occur, the toner can provide excellent image stability. Moreover, clumped frictional-electrification-amount distribution accompanied by the clumped toner particle size distribution can suppress occurrences of fogging. And uniform toner particle diameters can be developed while being arranged precisely and orderly to latent image dots, and thus it can provide excellent dot reproducibility.

The mass average particle diameter (D4) of the above-stated toner and its particle size distribution can be measured with, for example, a Coulter-counter-method. Examples of measurement devices using the Coulter-counter-method for measuring particle size distributions of toner particles are Coulter-Counter TA-II and Coulter Multisizer II (all manufactured by Beckman Coulter K. K).

A surface active surfactant (preferably alkylbenzene sulfonate) is added in an amount of 0.1 ml to 0.5 ml as a dispersant to 100 ml to 150 ml of an electrolytic water solution. Herein, the electrolytic solution is prepared with water solution containing 1% of NaCl by mass using 1st grade sodium chloride such as ISOTON-II (manufactured by Beckman Coulter K. K). And then, a measurement sample in the range of 2 mg to 20 mg is added. The electrolytic solution in which the sample is suspended is treated with a dispersion treatment using an ultrasonic distributor for 1 minute to 3 minutes, and using the above stated measurement device with using an 100 μm aperture, the volume and number of toner particles or toner are measured, and then the volume distribution and the number distribution is calculated. Based on the distributions obtained above, the mass average particle diameter (D4) and the number-average particle diameter (D1) of the toner are acquired.

Thirteen channels, 2.00 μm or more to less than 2.52 μm; 2.52 μm or more to less than 3.17 μm; 3.17 μm or more to less than 4.00 μm; 4.00 μm or more to less than 5.04 μm; 5.04 μm or more to less than 6.35 μm; 6.35 μm or more to less than 8.00 μm; 8.00 μm or more to less than 10.08 μm; 10.08 μm or more to less than 12.70 μm; 12.70 μm or more to less than 16.00 μm; 16.00 ρm or more to less than 20.20 μm; 20.20 μm or more to less than 25.40 μm; 25.40 μm or more to less than 32.00 μm; and 32.00 μm or more to less than 40.30 μm are used and target carrier particles are particles having particle diameters in the range of 2.00 μm or more to less than 40.30 μm.

These types of toners having almost-spherical shape particles can be produced through a cross-linking or an elongation reaction of toner components, which include polyester prepolymers having nitrogen-containing functional groups; polyester; coloring agent; and releasing agent, in aquatic medium in which resin fine particles exist. The toner produced therethrough, having the surface thereof harden, can reduce the occurrences of hot offset, and thus suppress the toner from adhering to a fixing unit and from fixing onto images.

Example of prepolymers made of the above-stated modified polyester resins are polyester prepolymers (A) having isocyanate groups, and examples of compounds used for the elongation or cross-linking reaction with the prepolymer are amines (B).

Examples of the polyester prepolymers (A) having the above-stated isocyanate groups are a polyester, the polyester is polycondensation products of polyols (1) and poly carboxylic acids (2) and has active hydrogen groups, further reacted with polyisocyanates (3). Examples of the active hydrogen groups contained in the polyester are a hydroxyl group (an alcoholic hydroxyl group and a phenolic hydroxyl group), an amino group, a carboxyl group, a mercapto group. Of those groups, the alcoholic hydroxyl group is particularly preferable.

Examples of the above-stated polyols (1) are diols (1-1), trivalent or more polyols (1-2), and (1-1) or a mixture of (1-1) and little amount of (1-2) are preferable.

Examples of the above-stated diols (1-1) are alkyleneglycols (ethylene glycol, 1,2-propylene glycol, 1,3-propylene glycol, 4-butanediol, 6-hexanediol and the like), alkyleneether glycols (diethylene glycol, triethylene glycol, Dipropylene glycol, polyethylene glycol, polypropylene glycol, poly(oxytetramethylene)glycol and the like); alicyclic diol (1,4-cyclohexanedimethanol, hydrogenated bisphenol A and the like); bisphenols (bisphenol A, bisphenol F, bisphenol S and the like); alkyleneoxide (ethyleneoxide, propyleneoxide, butyleneoxide and the like) adducts of the alicyclic diols; and alkyleneoxide (ethyleneoxide, propyleneoxide, butyleneoxide and the like) adducts of the bisphenols. Of these diols, alkyleneglycols having 2 to 12 carbon atoms and alkyleneoxide adducts of bisphenols are preferable, and combination of the alkyleneoxide adducts of bisphenols and alkyleneglycols having 2 to 12 carbon atoms are particularly preferable.

Examples of the above-stated trivalent or more polyols (1-2) are trivalent to octavalent or more polyphenol aliphatic alcohols (glycerine, trimethylolethane, trimethylolpropane, pentaerythritol and sorbitol and the like); trivalent or more phenols (trisphenol PA, phenol novolac, cresol novolac and the like); and alkyleneoxide adducts of the trivalent or more polyphenols.

Examples of the above-stated poly carboxylic acids (2) are dicarboxylic acids (2-1) and trivalent or more poly carboxylic acids (2-2), and (2-1) or a mixture of (2-1) and little amount of (2-2) are preferable.

Examples of the above-stated dicarboxylic acids (2-1) are alkylene dicarboxylic acids (succinic acid, adipic acid, sebacic acid and the like); alkenylene dicarboxylic acids (maleic acid, fumaric acid and the like); aromatic dicarboxylic acids (phthalic acid, isophthalic acid, terephthalic acid, naphthalene dicarboxylic acid and the like). Of those acids, alkenylene dicarboxylic acids having 4 to 20 carbon atoms and aromatic dicarboxylic acids having 8 to 20 carbon atoms are particularly preferable.

The above-stated trivalent or more poly carboxylic acids (2-2) are aromatic polycarboxylic acids having 9 to 20 carbon atoms (trimellitic acid, pyromellitic acid and the like). Poly carboxylic acids (2) cab be reacted with polyol (1) using above-stated acid anhydride or lower alkyl ester (methyl ester, ethyl ester, isopropyl ester and the like).

With respect of the proportion of the above-stated polyols (1) and poly carboxylic acids (2), the equivalent ratio [OH]:[COOH], the ration of hydroxyl groups [OH] to carboxyl groups [COOH], should preferably be in the range of 2:1 to 1:1, and more preferably 1.5:1 to 1:1, and further preferably 1.3:1 to 1.02:1.

Examples of the above-stated polyisocyanates (3) are aliphatic polyisocyanates (tetramethylene diisocyanate, hexamethylene diisocyanate, diusocyanatomethyl caproet and the like); alicyclic polyisocyanates (isophorone diusocyanate, cyclohexylmethanediisocyanate and the like); aromatic diisocyanates (tolylene diisocyanate, diphenylmethanediisocyanate and the like); aromatic-aliphatic diusocyanate (α,α,α',α'-tetramethylxylylene diisocyanate and the like); isocyanurates; and polyisocyanates blocked with a phenol derivative, an oxime, a caprolactam and the like. They can be used alone or in combination.

With respect of the proportion of the above-stated polyisocyanates (3), the equivalent ratio [NCO]:[OH], the ratio of isocyanate groups [NCO] to hydroxyl groups of polyester having hydroxyl groups [OH], should preferably be in the range of 5:1 to 1:1, and more preferably 4:1 to 1.2:1, and further preferably 2.5:1 to 1.5:1. When the [NCO] of the equivalent ratio [NCO]:[OH] is more than 5, low temperature fixation can be degraded, and when the [NCO] is less than 1, hot-offset resistibility can be degraded because of the reduction of the urea content in the modified polyester.

The component content of the polyisocyanate (3) having isocyanate groups at its terminals in prepolymer (A) should preferably be in the range of 0.5% by mass to 40% by mass, and more preferably 1% by mass to 30% by mass, and further preferably 2% by mass to 20% by mass. When the content is less than 0.5% by mass, degradation of hot-offset resistibility may occur, accompanied with disadvantages in keeping a balance between heat-resistant storage stability and low-temperature fixation, and when more than 40% by mass, low temperature fixation may be degraded.

The average number of isocyanate groups contained in a molecule of prepolymers (A) having the above-stated isocyanate group should preferably be more than 1, and more preferably it should be in the range of 1.5 to 3, and further preferably 1.8 to 2.5. When the average number of the groups per one molecule is less than 1, hot-offset resistibility may be degraded because of the reduction of molecular weight of urea-modified polyester.

Examples of the above-stated amines (B) are diamines (B1), trivalent or more polyamines (B2), amino alcohols (B4), aminomercaptans (B4), amino acids (B5), and B1 to B5 having blocked amino groups (B6). Examples of diamines (B1) are aromatic diamines (phenylenediamine, diethyltoluenediamine, 4,4'diaminodiphenylmethane and the like); alicyclic diamines (4,4'Diamino-3,3'dimethyldicyclohexylmethane, diamine cyclohexane, isophorone diamine and the like); and aliphatic diamines (ethylene diamine, tetramethylenediamine, hexamethylenediamine and the like). Examples of trivalent or more polyamines (B2) are diethylenetriamine and triethylenetetramine. Examples of amino alcohols (B3) are ethanolamine and hydroxyethylaniline. Examples aminomercaptans (B4) are aminoethylmercaptan and aminopropylmercaptan. Examples of amino acids (B5) are aminopropionic acid and aminocaproic acid. Examples of B1 to B5 having blocked amino groups (B6) are ketimine compounds obtained with amines of the above-stated B1 to B5 and ketones (acetone, methyl ethyl ketone, methyl isobutyl ketone and the like) and oxazoline compounds. Of these amines (B), B1 or a mixture of B1 and little amount of B2 are preferable.

Furthermore, molecular weight of urea-modified polyester can be adjusted in accordance with necessity with an elongation terminator. Examples of elongation terminators are monoamines (diethylamine, dibutylamine, butylamine, laurylamine and the like), and blocked monoamines (ketimine compounds).

With respect of the proportion of the above-stated amines (B), the equivalent ratio [NCO]:[NHx], the ratio of isocyanate groups [NCO] in prepolymer (A) having isocyanate groups to amino groups [NHx] in amines (B), should preferably be in the range of 1:2 to 2:1, and more preferably 1.5:1 to 1:1.5, and further preferably 1.2:1 to 1:1.2. When [NCO] of the ratio [NCO]:[NHx] is more than 2 or less than 1:2, hot-offset resistibility will be degraded because of the reduction of molecular weight of urea-modified polyesters (i).

In the present invention, urea-modified polyesters (i) modified with a urea bond can contain both a urea bond and a urethane bond. The mole ratio of the urea bond content and the urethane bond content should preferably be in the range of 100/0 to 10/90, and more preferably 80/20 to 20/80, and further preferably 60/40 to 30/70. When the mole proportion of the urea bonds is less than 10%, hot-offset resistibility may be degraded.

Through those reactions, modified polyesters used for the above-stated toner, particularly urea-modified polyesters (i) can be produced. The urea-modified polyesters (i) can be produced through a one-shot method or a prepolymer method.

The mass-average molecular weight of the urea-modified polyesters (i) should preferably be more than 10,000, and more preferably in the range of 20,000 to 10,000,000, and further preferably 30,000 to 1,000,000. When the mass-average molecular weight is less than 10,000, hot-offset resistibility may be degraded.

When after-mentioned unmodified polyester (ii) is used, the number-average molecular weight of the urea-modified polyesters is not particularly limited, and its value should be a number-average molecular weight therewith the above-stated mass-average molecular weight can easily be obtained. When only urea-modified polyester (i) is used, the number-average molecular weight should preferably be less than 20,000, and more preferably be in the range of 1,000 to 10,000, and further preferably 2,000 to 8,000. When the number-average molecular weight is more than 20,000, low temperature fixation as well as brilliance of images when formed with a full color image forming apparatus may be degraded.

In the present invention, the binder resin components can include not only the above-stated urea-modified polyesters (i) but also unmodified polyesters (ii). Using (i) in combination with (ii) can improve low temperature fixation as well as brilliance of images when formed with a full color image forming apparatus, and thus combination use is more preferable than using (i) alone. Examples of (ii) are polycondensation products of polyols (1) whose components are similar to that of polyesters (i) and poly carboxylic acid (2), and have preferences similar to (i). Furthermore, those modified with either unmodified polyesters or chemical bonds other than urea bond, can be used for (ii), and an example of other bonds is a urethane bond. Phase dissolution between at least a part of (i) and at least a part of (ii) is preferable from the aspect of low temperature fixation and hot-offset resistibility.

Therefore, the polyester components of (i) should have similar components to unmodified polyesters (ii). When (ii) is contained, the mass ratio (i):(ii) should preferably be in the range of 5:95 to 80:20, and more preferably 5:95 to 30:70, and further preferably 5:95 to 25:75, and particularly preferably 7:93 to 20:80. When (i) of the mass ratio (i):(ii) is less than 5% by mass, hot-offset resistibility may be degraded and, accompanied with disadvantages in keeping a balance between heat-resistant storage stability and low-temperature fixation.

The peak molecular weight of the above-stated unmodified polyesters (ii) should preferably be in the range of 1,000 to 30,000, and more preferably 1,500 to 10,000, and further preferably 2,000 to 8,000. When the peak molecular weight is less than 1,000, heat-resistant storage stability may be degraded, and when more than 10,000, low temperature fixation may be degraded.

Hydroxyl group number of the unmodified polyesters (ii) should preferably be 5 mgKOH/g or more, more preferably in the range of 10 mgKOH/g to 120 mgKOH/g, and further preferably 20 mgKOH/g to 80 mgKOH/g. When the hydroxyl group number is less than 5 mgKOH/g, the toner may have disadvantages in keeping a balance between heat-resistant storage stability and low temperature fixation.

Acid number of the unmodified polyesters (ii) should preferably be in the range of 1 mgKOH/g to 30 mgKOH/g, more preferably 5 mgKOH/g to 20 mgKOH/g. The toner tends to be negative electric by allowing the polyesters having acid number.

The glass-transition temperature (Tg) of the above-stated binder resin should preferably be in the range of 50° C. to 70° C., and more preferably 55° C. to 65° C. When the glass-transition temperature is less than 50° C., blocking of the toner may be degraded under a high temperature storage condition, and when more than 70° C., low temperature fixation may be insufficient. Through co-existence with a urea-modified-polyester resin, compare to known polyester toners, excellent heat-resistant storage stability for the toner used in the present invention can be obtained even when glass-transition temperature is low.

For the storage elastic modulus of the above-stated binder resin, a temperature (TG') at which the value of the storage elastic modulus is 10,000 dyne/$cm^2$ at measurement frequency of 20 Hz should preferably be 100° C. or more, and more preferably in the range of 110° C. to 200° C. When the temperature (TG') is less than 100° C., hot-offset resistibility may be degraded.

For the viscosity of the above-stated binder resin, a temperature (Tη) at which the value of viscosity is 1,000 Poise at measurement frequency of 20 Hz should preferably be 180° C. or less, and more preferably in the range of 90° C. to 160° C. When the temperature (Tη) is more than 180° C., low temperature fixation may be degraded. Therefore, in terms of keeping a balance between low temperature fixation and hot-offset resistibility, TG' should preferably be higher than Tη. In other words, the difference between TG' and Tη (TG'−Tη) should preferably be 0° C. or more, more preferably 10° C. or more, and further preferably 20° C. or more, while the upper value of the difference is not limited. Moreover, in terms of keeping a balance between heat-resistant storage stability and low temperature fixation, the difference between Tη and Tg should preferably be in the range of 0° C. to 100° C., and more preferably 10° C. to 90° C., and further preferably 20° C. to 80° C.

The above-stated binder resin can be produced through, for example, the following method.

First, above-stated polyol (1) and above-stated poly carboxylic acid (2) are given heat to a temperature in the range of 150° C. to 280° C. under the presence of known esterification catalysts such as tetrabutoxytitanate and dibutyltin oxide, while reducing pressure if necessary and removing derived water, and polyester having hydroxyl groups is obtained. Then, at a temperature in the range of 40° C. to 140° C., polyisocyanate (3) is reacted to the polyester, and prepolymer (A) having isocyanate groups is obtained. Furthermore, (A) is reacted with amines (B) at a temperature in the range of 0° C. to 140° C., and polyester modified with urea bonds is obtained. In accordance with necessity, a solvent can be used for having (3) react and for reaction between (A) and (B).

Examples of usable solvents are aromatic solvents (toluene, xylene and the like); ketones (acetone, methyl ethyl ketone, methyl isobutyl ketone and the like); esters (ethyl acetate and the like); and ingredients which are inactive to isocyanates (3), such as amides (dimethylformamide, dimethylacetamide and the like) and ethers (tetrahydrofuran and the like).

When polyesters (ii) unmodified with urea bonds are used concomitantly, a (ii) is produced in the same manners for polyester having hydroxyl groups, and then it is solved into solution, the solution after the reaction of the above-stated (i) is completed, and mixed.

Examples of production methods for producing the toner used in the present invention include the following method.

The above-stated toner can be formed through having dispersions made of prepolymers (A) which have isocyanate groups in an aquatic medium reacted with (B), or can be obtained through using urea-modified polyester (i) produced in advance. Examples of methods to stably form dispersions made of urea-modified polyesters (i) or prepolymers (A) in an aquatic medium include a shearing-force-employed dispersion-method while adding toner-material-compositions made of urea-modified polyester (i) or prepolymer (A) into aquatic medium.

The prepolymers (A) and other toner compositions (hereafter, toner compositions may be referred to as toner materials), the toner compositions include a colorant, a colorant master batch, a releasing agent, a charge controlling agent and a unmodified polyester resin, can be mixed when forming dispersions in the aquatic medium, but a dispersing method, adding the mixture into the aquatic medium after mixing toner materials, is more preferable. Moreover, in the present invention, other toner materials, such as the colorant, the releasing agent and the charge controlling agent, are not necessarily to be mixed in advance when forming particles in the aquatic medium, and the wax can be added after the particles are formed. For example, after particles having no colorants are formed, colorant can be added with a known dyeing method.

Water along can be used for the above-stated aquatic medium, but a water-miscible solvent also can be used. Examples of water-miscible solvents are alcohols (methanol, isopropanol, ethylene glycol and the like), dimethylformamide, tetrahydrofuran, cellosolves (methyl cellosolve and the like), lower ketones (acetone or methyl ethyl ketone and the like).

The used amount of an aquatic medium relative to the 100 parts by mass of toner compositions, the compositions including urea-modified polyester (i) or prepolymer (A), should preferably be in the range of 50 parts by mass to 2,000 parts by mass, and more preferably 100 parts by mass to 1,000 parts by mass. When the amount is less than 50 parts by mass, the dispersion state of the toner compositions may be degraded and toner particles having intended particle diameters may not be obtained, and when more than 2,000 parts by mass, production costs will be increased.

In accordance with necessity, a dispersant can be used. Using the dispersant is preferable as it will provide more clumped particle size distributions and make distributions more stable.

The above-mentioned dispersion methods are not particularly limited, and an adequate method can be selected in accordance with necessity. Examples are known ways such as a low-speed shearing way, a high-speed shearing way, a frictioning way, a high-pressure jet way and ultrasonic sound. The high-speed shearing way is preferable for having the particle diameters of the dispersions ranged from 2 μm to 20 μm. When using a high-speed-shearing-way dispersion machine, revolution speed is not particularly limited, but setting in the range of 1,000 rpm to 30,000 rpm is preferable, and 5,000 rpm to 20,000 rpm is more preferable. The dispersion duration is not particularly limited, but it is generally in the range of 0.1 minute to 5 minutes when using a batch method. A dispersion temperature in the range of 0° C. to 150°

C. is generally preferable, more preferably in the range of 40° C. to 98° C. Higher temperature is preferable as which can provide lower viscosity of the dispersions made of a urea-modified polyester (i) or a prepolymer (A) and make dispersion easier.

During the step for synthesizing urea-modified polyester (i) from prepolymer (A), amines (B) can be added and reacted before dispersing the toner compositions in the aquatic medium, or amines (B) can be added, causing a reaction from the particles interface therethrough, after the toner compositions are dispersed into the aquatic medium. Urea-modified polyester can preferential be formed on the surface of the toner obtained through the above methods, and thus particles can contain concentration gradient within.

In the above-stated reaction, using the dispersant in accordance with necessity is preferable.

The dispersant is not particularly limited, and an adequate dispersant can be selected in accordance with purpose. Examples of the dispersant are a surface active surfactant, a poor-water-solubility inorganic compound dispersant and a polymeric protective colloid. They can be used alone or in combination. Of these dispersants, the surface active surfactant is preferable.

Examples of the above-stated surface active surfactant are an anionic surfactant, a cationic surface active surfactant, a nonionic surfactant and an ampholytic surfactant.

Examples of the above-stated anionic surfactant are alkylbenzene sulfonate, alpha olefin sulfonate and phosphoric acid ester, and of these surfactants, those having fluoroalkyls are preferable. Examples of anionic-surface active surfactants having fluoroalkyls are a fluoroalkyl carboxylic acids of carbon atoms 2 to 10 or their metal salts, perfluorooctane sulfonyl disodium glutamate, 3-[omega-fluoroalkyl (of 6 to 11 carbon atoms) oxy]-1-alkyl (of 3 to 4 carbon atoms) sulfonate sodium, 3-[omega-fluoroalkanoyl (of 6 to 8 carbon atoms)-N-ethylamino]-1-propanesulfonate sodium, fluoroalkyl (of 11 to 20 carbon atoms) carboxylic acid or its metal salts, perfluoro alkyl carboxylic acid (of 7 to 13 carbon atoms) or its metal salts, perfluoro alkyl (of 4 to 12 carbon atoms) propanesulfonate or its metal salt, diethanolamide perfluorooctane sulfonate,N-propyl-N-(2-hydroxyethyl) perfluorooctanesulfonamides, perfluoro alkyl (of 6 to 10 carbon atoms) sulfonamide propyl trimethyl ammonium salt, perfluoro alkyl (of 6 to 10 carbon atoms)-N-ethylsulfonyl glycine salt and monoperfluoro alkyl (of 6 to 16 carbon atoms) ethylphosphoric acid ester. Examples of commercialized products of surface active surfactants having fluoroalkyls are Sarfron S-111, S-112, S-113 (all manufactured by ASAHI GLASS CO., LTD); Fluorad FC-93, FC-95, FC-98, FC-129 (all manufactured by Sumitomo 3M Limited); Unidyne DS-101, DS-102 (all manufactured by DAIKIN INDUSTRIES,LTD); Megafack F-110, F-120, F-113, F-191, F-812, F-833 (all manufactured by DAINIPPON INK AND CHEMICALS, INCORPORATED); Ectop EF-102, 103, 104, 105, 112, 123 A, 123 B, 306 A, 501, 201, 204 (all manufactured by Mitsubishi Materials Corporation); and Ftergent F-100, F-150 (all manufactured by NEOS Company Limited).

Examples of the above-stated cationic surface active surfactants are amine salt surfactants and quarternary ammonium salt type cationic surface active surfactants. Examples of the above-stated amine salt surfactants are alkylamine salt, amino alcohol fatty acid derivative, polyamine acid fatty acid derivative and imidazoline. Examples of the above-stated quarternary ammonium salt type cationic surface active surfactants are alkyltrimethylammonium salt, dialkyldimethylammonium salt, alkyldimethylbenzylammonium salt, pyridinium salt, alkylisoquinoline salt, and benzethonium chloride. Of these above cationic surface active surfactants, aliphatic primary, secondary or tertiary amine acids having fluoroalkyls, aliphatic quaternized ammonium salts such as perfluoro alkyl (of 6 to 10 carbon atoms) sulfonamide propyl trimethyl ammonium salt, benzalkonium chlorides, benzethonium chlorides, pyridinium salts and imidazolinium salts. Examples of commercialized products of the cation surfactants are Sarfron S-121 (manufactured by ASAHI GLASS CO., LTD.); Fluorad FC-135 (manufactured by Sumitomo 3M Limited); Unidyne DS-202 (manufactured by DAIKIN INDUSTRIES,LTD), MEGAFACK F-150, F-824(all manufactured by DAINIPPON INK AND CHEMICALS, INCORPORATED); Ectop EF-132 (manufactured by Mitsubishi Materials Corporation); and Ftergent F-300 (manufactured by NEOS Company Limited).

Examples of the above-stated nonionic surfactants are fatty acid amide derivatives, and polyalcoho derivatives.

Examples of the above-stated ampholytic surfactants are alanine, dodecyldi(aminoethyl)glycine, di(octylaminoethyl) glycine and N-alkyl-N,N-dimethylammonium betaine.

Examples of the above-stated inorganic compound dispersants having poor-water-solubility are calcium phosphate tribasic, calcium carbonate, titanic oxide, colloidal silica and hydroxyapatite.

Examples of the above-stated polymeric protective colloids are (meta)acrylic-type monomers having acids and/or hydroxyl groups, vinyl alcohols or ethers of vinyl alcohols, esters of compounds including vinyl alcohols and carboxyl groups, amide compounds or their methylol compounds, chlorides, homopolymers or copolymers having nitrogen atoms or their heterocyclic rings, polyoxyethylenes and celluloses.

Examples of the above-stated acids are acrylic acid, methacrylic acid, α-cyanoacrylate, α-cyanmethacrylic acid, itaconic acid, crotonic acid, fumaric acid, maleic acid and maleic anhydride. Examples of the above-stated (meta) acrylic-type monomers having hydroxyl groups are beta-acrylic acid-hydroxyethyl, beta-methacrylic acid-hydroxyethyl, beta-acrylic acid-hydroxypropyl, beta-methacrylic acid-hydroxypropyl, gamma-acrylic acid-hydroxypropyl, gamma-methacrylic acid-hydroxypropyl, 3-acrylic acid-chloro-2-hydroxypropyl, 3-acrylic acid-chloro-2-hydroxypropyl, diethylene glycol monoacrylic acid ester, diethylene glycol monomethacrylic acid ester, glycerol monoacrylic acid ester, glycerol monomethacrylic acid ester, N-methylolacrylamide and N-methylolmethacrylamide. Examples of the above-stated vinyl alcohols and ethers of vinyl alcohols are vinyl methyl ether, vinyl ethyl ether and vinyl propyl ether. Examples of the above-stated esters of compounds having vinyl alcohols and/or carboxyl group are vinyl acetate, vinyl propionate and vinyl butyrate. Examples of the above-stated amide compounds or their methylol compounds are acrylamide, methacrylamide and diacetone acrylamide or its methylol compounds. Examples of the above-stated chlorides are acrylate chloride and chloride methacrylate. Examples of the above-stated homopolymers or copolymers having nitrogen atoms or their heterocyclic rings are vinylviridine, vinylpyrrolidone, vinyl imidazole and ethyleneimine. Examples of the above-stated polyoxyethylenes are polyoxyethylene, polyoxypropylene, polyoxyethylene alkyl amine, polyoxypropylene alkyl amine, polyoxyethylene alkylamide, polyoxypropylene alkylamide, polyoxyethylenenonylphenylether, polyoxyethylenelaurylphenylether, polyoxyethyleneste arylphe nylether and polyoxyethylenenonylphenylester. Examples of the above-stated cellulose are methylcellulose, hydroxyethyl cellulose and hydroxypropylcellulose.

A dispersion stabilizer can be used in accordance with necessity for the preparation for the above-stated dispersion liquid. Examples of the dispersion stabilizer are acids such as phosphoric acid calcium salts and those having resolvent to alkalis. When the above-stated dispersion stabilizer is used, after fusing phosphoric acid calcium salt with acids such as hydrochloride, phosphoric acid calcium salt can be removed from fine particles through methods, such as a water-washing method and a decomposition method using enzymes.

For the preparation for the above-stated dispersion liquid, catalysts of the above-stated elongation reaction or the above-stated cross-linked reaction can be used. Examples of the catalysts are dibutyltin laurate, dioctyltin laurate and the like.

Furthermore, in order to lower the viscosity of the toner compositions, urea-modified polyesters (i) or solvents to which prepolymers (A) are soluble can be used. Using solvent is preferable as it can provide more clumped particle size distributions. The solvent should preferably be volatile so that it can easily be removed.

Examples of the above-stated solvent are toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone and methyl isobutyl ketone. They can be used alone or in combination. Of these solvents, aromatic solvents such as toluene and xylene; and halogenated hydrocarbons such as methylene chloride, 1,2-dichloroethane, chloroform and carbon tetrachloride are preferable, and aromatic solvents such as toluene and xylene are more preferable.

The used amount of solvent relative to the 100 parts by mass of the above-stated prepolymer (A) should preferably be in the range of 0 part by mass to 300 parts by mass, and more preferably 0 part by mass to 100 parts by mass, and further preferably 25 parts by mass to 70 parts by mass. When solvent is used, it is removed through giving heat under normal pressure or reduced pressure after the elongation and/or cross-linked reaction.

The reaction intervals of elongation and/or cross-linked reactions are determined by the combination reactivities between isocyanate group structures contained in prepolymer (A) and amines (B), and generally they are preferably in the range of 10 minutes to 40 hours, and more preferably 2 hours to 24 hours. The reaction temperature should preferably be in the range of 0° C. to 150° C., and more preferably 40° C. to 98° C. Furthermore, known catalysts can be used in accordance with necessity. Examples are dibutyltin laurate and dioctyltin laurate.

In order to remove organic solvent from obtained emulsion dispersant member, an evaporation removal method, wherein the entire part of the member is slowly given heat so that organic solvent in liquid drops can be evaporated and removed completely, can be used. Or, it can be removed by having an aquatic dispersant evaporated with forming toner fine particles through completely removing non-water-soluble organic solvent in liquid drops with spraying emulsion dispersant member into a dry atmosphere. Examples of the dry atmosphere into which emulsion dispersant member is sprayed are heated gases of air, nitrogen, carbon dioxide and combustion gas, and generally various streams heated above a temperature of boiling temperatures of highest boiling temperature of solvents used are used. Short time treatment with a spray drier, a belt drier, or a rotary kiln can sufficiently provide desired quality.

When a particle size distribution is dispersed on emulsion dispersion and cleaning and drying treatment are conducted while keeping the particle size distribution, particle size distribution can be arranged through a classification aiming at a desired particle size distribution.

Through a classification operation, steps such as cyclone, decanter and centrifugal separation, fine particles can be removed in solution. The classification operation can be conducted after powder obtained after drying is obtained, but conducting the operation in solution is preferable as doing so has better efficiency. Unwanted fine particles or coarse particles obtained therethrough can be again returned to the kneading step and used for forming particles. When returning the unwanted fine particles or coarse particles, those particles can be in wet condition.

The used dispersants should preferably be removed from the obtained dispersion liquid as much as possible, but removing should preferably be conducted at the same time with the above-stated classification operation.

Detachment of other particles from the surface of the obtained complex particles can be prevented by mixing together the obtained dried-toner powder and other particles such as releasing agent fine particles, charge controllability fine particles, fluidizer fine particles and colorant fine particles, or through giving mechanical shocks to the mixed powder so that they can be fixed and melted to the surface.

Specific methods include (1) giving impact force to the mixture with fast-spinning blades, and (2) having particles or a complex particle collide with an adequate impinging plate in a high-velocity stream through injecting and accelerating the mixture into the stream. Examples of devices can be used are Ongmill (manufactured by Hosokawa Micron Corporation), a modified I-Ttype Mill (manufactured by Nippon Pneumatic Mfg. Co., Ltd.) so its grinding air pressure is decreased, Hybridization System (manufactured by NARA MACHINERY CO., LTD.), Kryptron System (manufactured by Kawasaki Heavy Industries, Ltd.), and automatic mortars.

Pigments and staining traditionally used for colorants for toners can be used for the colorants of the toner, and examples are carbon black, lampblack, iron black, ultramarine blue, nigrosine staining, aniline blue, phthalocyanin blue, phthalocyanine green, hansa yellow-G, rhodamine 6C lake, calco oil blue, chrome yellow, quinacridon red, benzidine yellow and rose bengal. They can be used alone or in combination.

In accordance with necessity, in order to have toner particles have magnetic property, iron oxides such as ferrite, magnetite, maghemite; and magnetism compositions such as metals, like iron, cobalt and nickel, and alloys of other metals with these metals alone or in combination can be contained in the toner particles. Moreover, these compositions may be used as a colorant composition.

The number-average particle diameter of the particles of colorants of the toner used in the present invention should preferably be less than 0.5 μm, more preferably less than 0.4 μm, and further preferably less than 0.3 μm. When the number-average particle diameter is more than 0.5 μm, the dispersibility of pigments may be insufficient and desirable transparency may not be obtained. On the other hand, when the number-average particle diameter is less than 0.1 μm, particles of the colorants having fine particle diameters are smaller enough than the half-wave length of visible light so that they are considered as they contain no negative affect on the reflective property and absorptive property of light. Thus, the particles having the number-average particle diameter in less than 0.1 μm of colorant contribute to achieving excellent color reproducibility and transparency of an OHP sheet having fixed images. By contrast, when a number of particles having number-average particle diameter in more than 0.5 μm exist in the colorants, permeation of incident light will be inhabited or dispersed, and the brightness and contrast of the projection images of an OHP sheet tend to be degraded. Furthermore, a number of particles having a diameter of more than 0.5 μm in colorant may cause detachment of colorants from the surface of the toner particles, and may result in causing problems, such as fogging, drum contamination and cleaning failure. The proportion of particles of the number-average particle diameters in more than 0.7 μm in colorant should preferably be less than 10 number % to the entire colorants, and more preferably less than 5 number %.

Through an advance mixing stage, mixing the above-stated colorants with a part or entire part of binder resins after wetting solution is added thereon in advance, better transparency can be obtained because of smaller distributed colorant particle diameters obtained through higher efficiency of colorants dispersion in the toner particle during a toner production step, after the beginning condition wherein binder resin can sufficiently adhere to colorants is made at the advance mixing stage.

For the binder resins used for the advance mixing stage, resins exemplified above as examples of binder resins for toner can be used, but not limited to those resins.

Examples of specific methods used in the above-stated advance mixing stage to mix the mixture of binder resin and colorants with wetting solution in advance are a method wherein the mixture of binder resin, colorants and wetting solution mixed with a blender such as Henschel Mixer are kneaded with a kneading machine equipped with two-roll or three-roll at a temperature lower than the molten temperature of the binder resin, and thus a sample can be obtained.

Choices of the above-stated wetting solution are not particularly limited, and known ones can be selected by considering solubility of the binder resin and affinity for colorants. Preferable examples of solutions are organic solvents such as acetone, toluene and butanone and water from the aspect of colorant dispersibility. Of these solutions, using water is particularly preferable from the aspect of reducing environment burden and maintaining colorant dispersion stability at following toner producing step.

Through this production method, not only smaller particle diameter of the colorants contained in the obtained toner can be obtained, but also higher uniformity of dispersion state of the particles can be obtained, and thus better color reproductivity of projection image for OHP can further be achieved.

The above-stated toner should preferably contain the above-stated binder resin and the above-stated colorants with a releasing agent.

Choices of the releasing agent are not particularly limited and known ones can be selected in accordance with purpose. Examples of the releasing agents are polyolefin waxes (polyethylene wax, polypropylene wax and the like); long chain hydrocarbons (paraffin waxes, Sasol waxes and the like); carbonyl group contained waxes. Of these waxes, carbonyl group contained waxes are particularly preferable.

Examples of the carbonyl group contained waxes are poly alkanoic acid esters (Carnauba wax, montan wax, trimethylolpropane tribehenate, pentaerythritol tetrabehenate, pentaerythritol diacetate dibehenate, glycerine tribehenate, 1,18-octadecanediol distearate and the like); polyalkanol esters (trimellitic acid stearyl, distearylmaleate and the like); polyalkanoic acid amides (ethylene diamine dibehenylamide and the like); polyalkylamide (trimellitic acid stearylamide and the like); and dialkylketones (distearylketone and the like). Of these waxes, poly alkanoic acid esters are particularly preferable.

The melting-temperature of above-stated releasing agent should preferably be in the range of 40° C. to 160° C., and more preferably 50° C. to 120° C., and further preferably 60° C. to 90° C. When the melting-temperature is less than 40° C., heat-resistant storage stability may be degraded, and when more than 160° C., the occurrences of cold offset during fixing at a low temperature may increase.

The melt viscosity of the above-stated releasing agent at the temperature 20° C. above the melting-point should preferably be in the range of 5 cps to 1,000 cps, and more preferably 10 cps to 100 cps. When the melt viscosity is more than 1,000 cps, enhancing effects on hot-offset resistibility and low temperature fixation may be reduced.

The content of the above-stated releasing agent in the above-stated toner should preferably be in the range of 0% by mass to 40% by mass, and more preferably 3% by mass to 30% by mass.

In accordance with necessity, a charge controlling agent can be contained in the toner in order to achieve fast start-up time of charging toner. Using pigmented materials are used for the charge controlling agent results in changes of colors, thus, using materials of achromatous or close to white color is preferable.

Choices of the charge controlling agent are not particularly limited and suitable one or more can be selected from among those known in the art, however, it is preferable to use a colorless charge controlling agent or a charge controlling agent being close to white color because the color tone may be changed when a colored material is used. Examples of the colorless controlling agent or the controlling agent being close to white color include nigrosine dyes, triphenyl methane dyes, chrome-containing metal complex dyes, molybdate chelate pigments, Rhodamine dyes, alkoxy amine, quaternary ammonium salt (including fluorine-modified quaternary ammonium salt), alkyl amide, phosphorous monomers or compounds thereof, tungsten monomers or compounds thereof, fluorine activators, metal salts of salicylic acid, and metal salts of salicylic acid derivatives.

For the charge controlling agent, a commercially available one may be used, and examples of the commercially available charge controlling agent include BONTRON P-51 of a quaternary ammonium salt, E-82 of an oxynaphthoic acid metal complex, E-84 of a salicylic acid metal complex, and E-89 of a phenol condensation product (all manufactured by Orient Chemical Industries, Ltd.); TP-302 or TP-415 of a molybdenum complex of quaternary ammonium salt (all manufactured by Hodogaya Chemical Co.); Copy Charge PSY VP2038 of a quaternary ammonium salt, Copy Blue PR of a triphenyl methane derivative, and Copy Charge NEG VP2036 of a quaternary ammonium salt or Copy Charge NX VP434 (all manufactured by Hochst Corporation); LRA-901, and LR-147 of a boron complex (manufactured by Japan Carlit Co., Ltd.); quinacridone; azo pigments; and high-molecular compounds having a functional group such as sulfonic acid group, and carboxyl group.

The added amount of the charge controlling agent is not particularly limited and may be suitably adjusted in accordance with the intended use, however, it is preferably 0.1 part by mass to 10 parts by mass relative to 100 parts by mass of the resin fine particles, and more preferably 0.2 part by mass to 5 parts by mass relative to 100 parts by mass of the resin fine particles. When the added amount of the charge controlling agent is more than 10 parts by mass, the charge property of the toner is excessively increased, and the excessively increased charge property of the toner impairs the effect of the main charge controlling agent to increase the electrostatic attraction force between the toner and developing rollers, and this may cause degradation of flowability of the developer and degradation of image density. These charge controlling agents can be melted and dispersed after melted and knead with a master batch and a resin, can be directly dissolved into an organic solvent and added when dispersing, or can be fixed after toner particles are formed on the surface of the toner.

During toner production process, when dispersing toner compositions in an aquatic medium, resin fine particles, mainly for stabilizing dispersion, may be added.

Any kinds of resin can be used for the above-stated resin fine particles as long as they can form hydrophilic dispersions, and they can be thermoplastic resins or thermosetting resins. Examples are vinyl resins, polyurethane resins, epoxy resin, polyester resin, polyamide resin, polyimide resin, silicon resins, phenol resin, melamine resin, urea resin, aniline resin, ionomer resin and polycarbonate resin. They can be used alone or in combination. Of the above resins, using vinyl resins, polyurethane resin, epoxy resin, or polyester resin alone or in combination is preferable for hydrophilic dispersions of fine spherical resin particles can be easily obtained with these resins.

For the vinyl resins, homopolymer or copolymer based on vinyl monomers are used, and examples are styrene-(meta) acrylic acid ester resin, styrene-butadiene copolymers (meta) acrylic acid-acrylic acid ester copolymer, styrene-acrylonitrile copolymers, styrene-maleic acid anhydride copolymer, and styrene-(meta) acrylic acid copolymer.

Using inorganic particulate as an external additive is preferable for enhancing flowability, development ability and charging ability of toner particles.

Examples of the inorganic particulates are silica, alumina, titanic oxide, barium titanate, magnesium titanate, calcium titanate, strontium titanate, zinc oxide, tin oxide, silica sand, clay, mica, tabular spar, diatomite, chromium oxide, cerium oxide, iron oxide red, antimony trioxide, magnesium oxide, oxidized zirconium, barium sulphate, barium carbonate, calcium carbonate, silicon carbide and silicon nitride.

The primary particle diameter of the above-stated inorganic particulate should preferably be in the range of 5 nm to 2 μm, and more preferably 5 nm to 500 nm. The specific surface area of the inorganic particulate calculated by BET method should preferably be in the range of 20 $m^2/g$ to 500 $m^2/g$. The additive amount of the inorganic particulate of the above-stated toner should preferably be in the range of 0.01% by mass to 5% by mass, and more preferably 0.01% by mass to 2.0% by mass.

Examples of other polymer fine particles are polystyrenes obtained through soap-free-emulsion polymerization, suspension polymerization, or dispersion polymerization; polycondensation products such as methacrylic acid ester, acrylic acid ester copolymer, silicone, benzoguanamine, nylon; and polymer particles of thermosetting resins.

A fluidizer can be contained in the toner. The fluidizer can prevent degradation of flow characteristics and charging characteristics under a high humidity condition through increasing hydrophobic property with surface treatment. Examples of the fluidizer are silane coupling agents, silylation agents, silane-coupling agents having alkyl fluorides, organotitanium coupling agents, aluminum coupling agents, silicone oil, and modified silicone oil.

Examples of a booster for improving the ability of cleaning, cleaning for removing the remaining developer on a photoconductor or an intermediate transfer member after transferring are fatty acid metal salts such as zinc stearate, stearic acid calcium and stearic acid; and polymer fine particles produced through soap-free-emulsion polymerization such as polymethylmethacrylate fine particles and polystyrene fine particles. Those polymer fine particles having relatively narrower particle size distribution and volume average particle diameter in the range of 0.01 μm to 1 μm are preferable.

Through using such toner, toner images having, as mentioned above, stability on development and high image quality can be formed.

For the image forming apparatus of the present invention, not only tones such as the above mentioned polymerization-processed toners designed for obtaining high quality images, but also grind-processed amorphous toner can be used, and in either case, operating life of the apparatus can be drastically extended. Toner material generally used for electrophotographic toner can be used for the grind-processed toner material without any particular limitation.

Choices of the binder resin are not particularly limited and suitable one or more can be selected in accordance with the intended use. Examples thereof include styrene or substitution polymers thereof such as polystyrene, and polyvinyl toluene; styrene-p-chlorostyrene copolymers, styrene-propylene copolymers, styrene-vinyltoluene copolymers, styrene-methyl acrylate copolymers, styrene-ethyl acrylate copolymers, styrene-butyl acrylate, styrene-methyl methacrylate copolymers, styrene-ethyl methacrylate copolymers, styrene-butyl methacrylate copolymers, styrene-α-chloromethyl methacrylate copolymers, styrene-acrylonitrile copolymers, styrene-vinyl methyl ether copolymers, styrene-vinyl methyl ketone copolymers, styrene-butadiene copolymers, styrene-isoprene copolymers, styrene-maleic acid copolymers, styrene-maleic acid ester copolymers, methyl polymethacrylate, butyl polymethacrylate, polyvinyl chloride, polyvinyl acetate, polyethylene, polypropylene, polyester resin, polyurethane, epoxy resin, polyvinyl butyral, polyacrylic acid resins, rosins, modified rosins, terpene resins, phenol resins, alicyclic or aliphatic hydrocarbon resins, aromatic petroleum resins, chlorinated paraffins, and paraffin waxes. Each of these binder resins may be used alone or in combination with two or more. Of these, polyester resins are particularly preferable in terms that the melt viscosity can be reduced while ensuring the storage stability of a toner as compared to styrene resins and acrylic resins.

The above-stated grind-processed toner can be produced through mixing those resin components with the above-mentioned components such as colorant components, wax components and charge control components, where mixing can be done in accordance with necessity and kneading them at a temperature near the molten temperature of the resin components, and then, after cooling, through comminution and classification steps. In accordance with necessity, the above-stated external additive components may adequately be added and mixed.

The above-stated image developing apparatus can be either a dry type image-developer or a wet type image-developer, and a single color image developing apparatus or a multiple color image developing apparatus. A preferable example is one having an agitator charging the above-stated toner and the above-stated developer through friction-dispersion means and a revolvable magnet roller.

In the above-stated image developing apparatus, for example, the above-stated toner and the above-stated carrier are mixed and dispersed, the toner is charged with friction generated thereat, and the toner is borne in a magnetic brush condition on the surface of the revolving magnet roller, and thereby a magnetic brush is formed. Because the magnet roller is located near the above-stated image bearing member (or photoconductor), a part of the toner composing the magnetic brush formed on the surface of the magnet roller moves to the surface of the image bearing member (or photoconductor) with electrical sucking force. As a result, the above-stated latent electric field image is developed using the toner, and thus a toner visible image is formed on the surface of the image bearing member (photoconductor) therethrough.

A developer, the developer including the above-stated toner moved thereby, used in the above-stated image developing apparatus can be a one-component developer or a two-component developer.

<Transferring Step and Transferring Unit>

In the transferring step, the visible image is transferred onto a recording medium, and it is preferably an aspect in which an intermediate transfer member is used, the visible image is primarily transferred to the intermediate transfer member and then the visible image is secondarily transferred onto the recording medium. An embodiment of the transferring step is more preferable in which two or more color toners are used, an embodiment of the transferring is still more preferably in which a full-color toner is used, and the embodiment includes a primary transferring in which the visible image is transferred to an intermediate transfer member to form a composite transfer image thereon, and a secondary transferring in which the composite transfer image is transferred onto a recording medium.

The transferring can be performed, for example, by charging a visible image formed on the surface of the photoconductor using a transfer-charger to transfer the visible image, and this is enabled by means of the transferring unit. For the transferring unit, it is preferably an embodiment which includes a primary transferring unit configured to transfer the visible image to an intermediate transfer member to form a composite transfer image, and a secondary transferring unit configured to transfer the composite transfer image onto a recording medium.

The intermediate transfer member is not particularly limited, may be suitably selected from among those known in the art in accordance with the intended use, and preferred examples thereof include transferring belts.

The above-stated image bearing member can be an intermediate transfer member which is used for image forming with a so-called intermediate transfer method wherein a toner image formed on a photoconductor is transferred onto the recording medium after color-overlapping through the primarily transfer step.

—Intermediate Transfer Member—

The intermediate transfer member should preferably be the one having conductivity in the range of $1.0\times10^5$ Ω·cm to $1.0\times10^{11}$ Ω·cm in the volume resistance. When the volume resistance is less than $1.0\times10^5$ Ω·cm, the toner image is transferred from the photoconductor to the intermediate transfer member, so-called transfer dust in which toner image is distorted accompanying with discharge may occur, and when more than $1.0\times10^{11}$ Ω·cm, after the toner image is transferred from the intermediate transfer member to the recording medium such as paper, toner image counteracting charge may residue on the intermediate transfer member, causing generation of a residual image on a next image to be developed.

Examples of the above-stated intermediate transfer member are belt-shaped plastics or cylindrical plastics made of a thermoplastic resin mixed with single or combinational use of metal oxide such as tin oxides and indium oxides or/and conductive particles or conductive polymers such as carbon black, and formed in an extrusion molding. Another example is an end-less belt intermediate transfer member made of resin solution containing heat cross-linking reactive monomers/oligomers and to which the above-stated conductive particles conductive polymers are added in accordance with necessity, and then the belt intermediate transfer member is given heat while being formed in a centrifugal molding.

When placing a surface layer on the intermediate transfer member, materials used for the photoconductor surface layer except charge transport materials can be used for the surface layer on the intermediate transfer member while adjusting resistance of materials used therefor concomitantly using conductive substances in accordance with necessity.

The transferring unit (including the primary transferring unit and the secondary transferring unit) preferably includes at least an image-transferer configured to exfoliate and charge the visible image formed on the photoconductor to transfer the visible image onto the recording medium. For the transferring unit, there may be one transferring unit or two or more transferring units. Examples of the image transferer include coronan image transferers using corona discharge, transferring belts, transfer rollers, pressure transfer rollers, and adhesion image transfer units.

Choices of the recording medium are not particularly limited and one can be suitably selected from among those known in the art.

<Protection Layer Forming Step and Protection Layer Forming Apparatus>

The above-stated protection layer forming step is a step for forming a protection layer on the surface of the above-stated image bearing member, the surface after image transfer, using the above-stated image bearing member protecting agent of the present invention.

For the protection layer forming apparatus, the above-stated protection layer forming apparatus of the present invention can be used.

<Fixing Step and Fixing Unit>

The fixing step is a step in which a visible image which has been transferred onto a recording medium is fixed using a fixing apparatus, and the image fixing may be performed every time each color toner is transferred onto the recording medium or at a time so that each of individual color toners are superimposed at the same time.

The fixing apparatus is not particularly limited, may be suitably selected in accordance with the intended use, and heat-pressurizing units known in the art are preferably used. Examples of the heat-pressurizing units include a combination of a heat roller and a pressurizing roller, and a combination of a heat roller, a pressurizing roller, and an endless belt.

The heating temperature in the heat-pressurizing unit is preferably 80° C. to 200° C.

In the present invention, for example, an optical fixing apparatus known in the art may be used in the fixing step and the fixing unit or instead of the fixing unit.

The charge elimination step is a step in which charge is eliminated by applying a charge-eliminating bias to the photoconductor, and it can be suitably performed by means of a charge-eliminating unit.

The charge-eliminating unit is not particularly limited as long as a charge-eliminating bias can be applied to the latent electrostatic image bearing member, and may be suitably selected from among charge-eliminating units known in the art. For example, a charge-eliminating lamp or the like is preferably used.

The cleaning step is a step in which a residual electrographic toner remaining on the photoconductor is removed, and the cleaning can be preferably performed using a cleaning unit.

The cleaning unit is not particularly limited, provided that the residual electrophotographic toner remaining on the photoconductor can be removed, and may be suitably selected from among those known in the art. Examples of the cleaning unit include magnetic brush cleaners, electrostatic brush cleaners, magnetic roller cleaners, blade cleaners, brush cleaners, and web cleaners.

The recycling step is a step in which the toner that had been eliminated in the cleaning is recycled in the developing, and the recycling can be suitably performed by means of a recycling unit. The recycling unit is not particularly limited, and examples thereof include carrying units known in the art.

The above-stated controlling step is a step for controlling above-stated each step, and controlling can be preferably done with a controlling unit.

The controlling unit is not particularly limited as long as it can control above-stated each step, and an adequate controlling unit can be selected in accordance with purpose. Examples are sequencer and computer devices.

Figure 2:
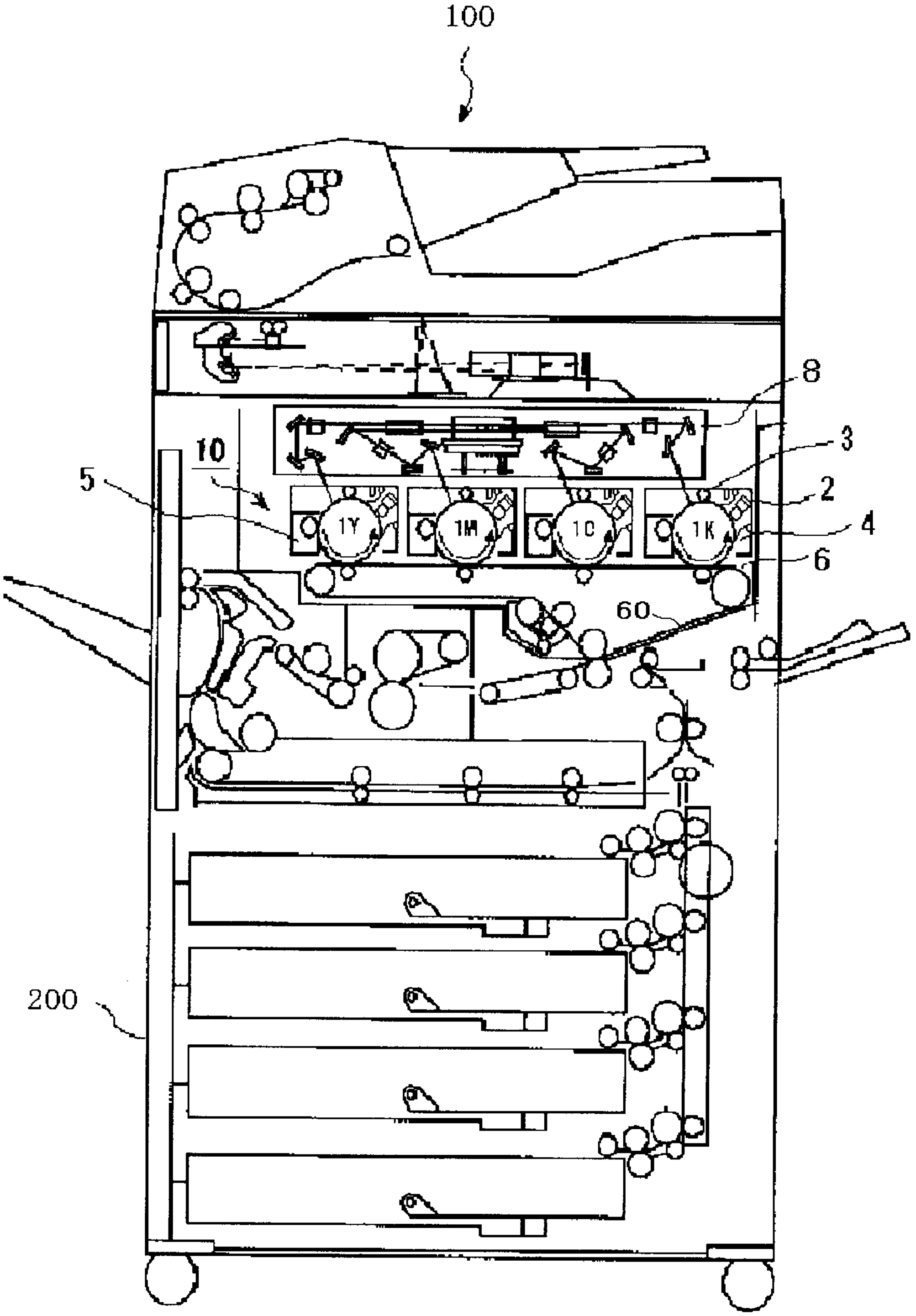
FIG. 2 is a schematic diagram showing an example of the image forming apparatus of the present invention.

FIG. 2 is a cross sectional plan view showing an example of an image forming apparatus 100 equipped with the protection layer forming apparatus of the present invention.

Protection layer forming apparatus 2, charging units 3, a latent image forming unit 8, developing units 5, image transferers 6 and cleaners 4 are arranged around each of drum-shaped image bearing members 1 Y, 1 M, 1 C and 1 K, and image forming will be conducted through the following processes.

A series of the image forming process can be explained in a negative-positive process. Charges on an image bearing members typified by an organic photoconductor (OPC) having an organic photoconductive layer are eliminated using devices such as a charge elimination lamp (not shown) and are uniformly negatively charged with the charging units 3.

For charging the image bearing members using the charging units, a voltage or an alternating-voltage-superimposed charging voltage (either voltage is in an adequate amount for the charging image bearing members 1 Y, 1 M, 1 C and 1 K) in an intentional amount of electrical potential will be applied to the charge members using a charge applying mechanism (not shown).

A Latent image (the absolute value of an exposed-area electrical potential is lower than the absolute value of an unexposed-area electrical potential) will be formed on the image bearing members 1 Y, 1 M, 1 C and 1 K after the surface thereof are charged through laser beam-irradiations generated with the latent image forming units 8 employing an optical system such as a laser beam optical system.

The laser beam generated from a semiconductor laser scans the surfaces of the image bearing members 1 Y, 1 M, 1 C and 1 K in the direction of the rotational axis of the image bearing members using equipment such as fast-speed revolving polygonal mirrors (polygon) on polygonal poles.

Latent images formed thereby is then developed using a developer which contains toner particles or a mixture of toner particles and carrier particles supplied to developing a sleeve serving as a developer bearing member in the developing units 5 to thereby form toner visible images.

For latent image developing, an adequate amount of voltage existing between exposed areas and unexposed areas of the image bearing members 1 Y, 1 M, 1 C and 1 K or a developing bias, the bias wherein the voltage is overlapped with alternating voltage, is applied to the developing sleeves using the voltage applying mechanism (not shown).

The toner images for each color formed on the image bearing members 1 Y. 1 M, 1 C and 1 K are transferred onto an intermediate transfer member 60 using the image transferer 6, and then transferred onto a recording medium such as paper, fed from a sheet feeding mechanism 200.

During transferring the toner image on the recording medium, a reverse potential to the toner charge should preferably be applied to the transferer 6 as a transfer bias. Then, the recording medium is released from the intermediate transfer member 60, and thereby a transferring image is obtained.

Residual toner particles remaining on the surface of the image bearing members are collected to a toner collection chamber within the cleaners 4 using cleaning members.

The image forming apparatus may be an apparatus in which a plurality of the image developing unit described above are arranged to sequentially transfer toner images in different colors sequentially formed with the developing unit onto a recording medium, and the toner image is sent to a fixing mechanism to be fixed by heat, etc., or may be an apparatus in which a plurality of toner images are transferred onto an intermediate recording medium once, and the toner images on the intermediate recording medium are transferred onto a recording medium at a time to be fixed in a similar manner as mentioned above.

Furthermore, the above-stated charging unit 3 should preferably be a charging unit located in a contact state with or in a state near the surface of the image bearing member, and a discharge wire is used for the chagrin unit. Thereby, the amount of ozone generated at charging can be greatly reduced compared with that of a corona discharger such as a corotron and a scorotron.

Such like charging units conducting charging in a contact state with or in a state near the surface of the image bearing member conduct charging in the areas close to the surface of the image bearing member, an electrical stress applied on the image bearing member tends to be larger. However, employing the protection layer forming apparatus using the image bearing member protecting agent of the present invention can enable keeping image quality while enabling conserving the image bearing member, preventing deterioration thereof over a long period of time, and greatly suppressing an over-time image change and an image change caused by operation environment.

As mentioned above, because the image forming apparatus of the present invention can provide an excellent latitude to changes of the image bearing member surface conditions, particularly to a change in which some surface areas of the image bearing member become low resistance areas, and highly suppressed fluctuation on charge ability of the image bearing member, using the image forming apparatus of the present invention in combination with the toner composed in accordance with the above mentioned composition enables stably forming extremely high quality images for a long period of time.

(Process Cartridge)

The process cartridge of the present invention has at least an image bearing member and the above-stated protection layer forming unit, and can contain other units such as a charging unit, an exposing unit, a developing unit, a transferring unit, cleaning unit and a charge-elimination unit, in accordance with necessity.

The process cartridge of the present invention can be detachably attached to the bodies of various types of image forming apparatuses, and should preferably be detachably attached to the image forming apparatus of the present invention.

Figure 3:
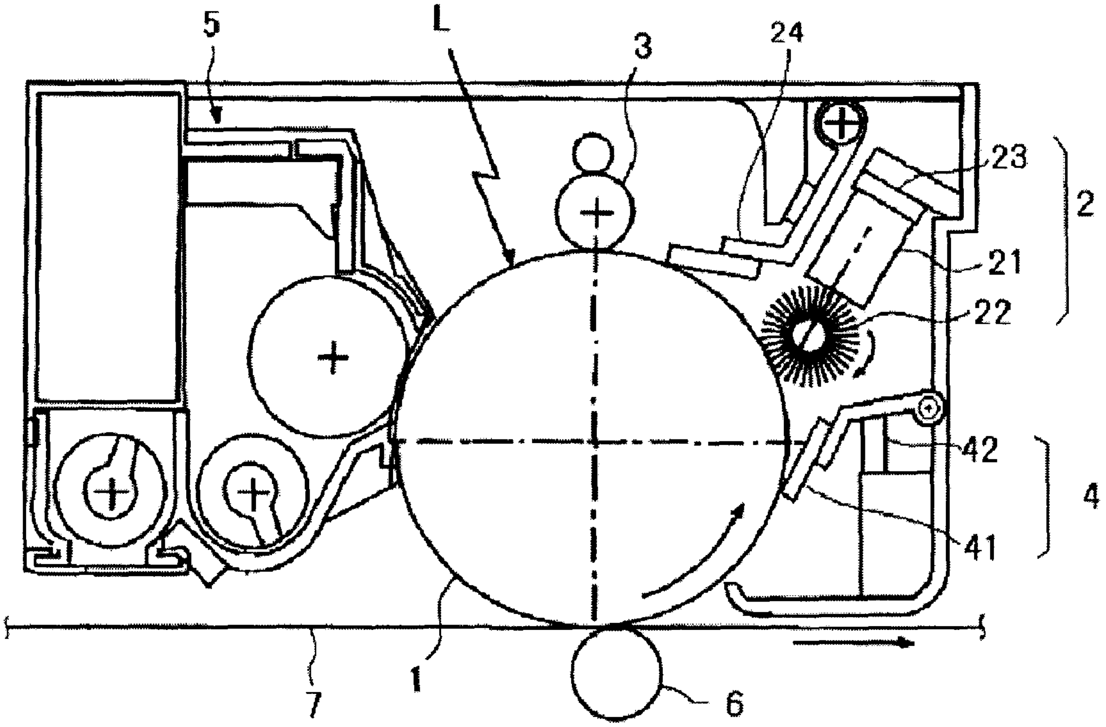
FIG. 3 is a schematic diagram showing an example of the process cartridge of the present invention.

FIG. 3 is a schematic diagram showing a configuration example the process cartridge using the protection layer forming apparatus of the present invention.

The process cartridge includes an image bearing member 1, or a photoconductor drum 1, and a protection layer forming apparatus 2 placed facing the image bearing member, and the protection layer forming apparatus 2 includes the image bearing member protecting agent 21, the protecting agent supply member 22, the suppress pressure application member 23, and the protection layer forming member 24.

The surface of the image bearing member 1 may be a surface on which partly deteriorated residue products, deteriorated after a transferring step, of, such as image bearing member protecting agents and toner components, remain, and the surface will be cleaned using a cleaning member 41 to remove those products.

In FIG. 3, the cleaning member contacts the image bearing member with an angle, the angle in a counter type (or leading type).

To the surface of the image bearing member, after toners and deteriorated image bearing member protecting agents remaining thereon are removed with the cleaning mechanism, the image bearing member protecting agent contained in the image bearing member protecting agent 21 will be supplied using the protecting agent supply member 22 to thereby form a protection layer formed using the protection layer forming member 24. In the meanwhile, to areas, having higher hydrophilicity caused by electrical stresses, of the surface of the image bearing member, the image bearing member protecting agent used in the present invention will have better sorbability and thus, when an area of the surface of the image bearing member starts deteriorating from a large electrical stress applied temporarily thereto, the sorbability of the protecting agent can prevent the image bearing member itself from deteriorating.

After charging, exposure L generated by using a leaser beam or the like will be used for forming a latent electric field image on the surface of the image bearing member which has a protection layer thereon thus formed, and then the latent electric field image will be developed and visualized into a visual image using the developing units 5, and then transferred onto a recording medium 7 using, for example, a transfer roller 6 which is out of the process cartridge.

As mentioned above, because the image forming apparatus of the present invention can provide an excellent latitude to changes of the image bearing member surface conditions, particularly to a change in which some surface areas of the image bearing member become low resistance areas, and highly suppressed fluctuation on charge ability of the image bearing member, using the image forming apparatus of the present invention in combination with the toner composed in accordance with the above mentioned composition enables stably forming extremely high quality images for a long period of time.

According to the present invention, the present invention can solve the foregoing conditional problems and can provide an image bearing member protecting agent, which can protect the image bearing member from electrical stresses such as a stress generated during charging step and from mechanical stresses such as a stress generated from the friction between the image bearing member and the cleaning member, an image bearing member protecting agent wherein deteriorated protecting agents thereof deteriorated from electrical stresses have less effect on image quality and surrounding members, and a protection layer forming apparatus using the protecting agent, and further to provide an image forming method, an image forming apparatus, and a process cartridge which use the above-mentioned protecting agent and the protection layer forming apparatus to therethrough stably form high quality images.

EXAMPLES

The present invention will be explained with reference to the following Examples; however, these Examples are intended to illustrate the invention and are not to be construed to limit the scope of the present invention.

Example 1

—Production of Image Bearing Member Protecting Agent 1—

The compositions of Protecting Agent No. 1 shown in Table 1 and Table 2 were contained in a glass container equipped with a lid and then molten using a temperature-controlled hot stirrer, holding its temperature at 120° C., while the compositions were agitated.

The molten compositions of Protecting Agent No. 1 were poured into a preheated aluminum mold at a temperature of 85° C. having internal dimension of 12 mm×8 mm×350 mm so that the mold was filled up with molten compositions, then allowed to stand to cool down to 50° C. under room temperature, re-heated in a constant-temperature bath, holding a constant temperature, to 60° C. and kept for 20 minutes at the temperature, and then stood to cool down to room temperature.

After cooling, solidified Protecting Agent No. 1 was detached from the mold, and shaped into a mass having its size of 7 mm×8 mm×310 mm in a cutting process, thus image bearing protecting agent 1 was produced. Image bearing member protecting agent 1 thereby obtained was further attached to a metal support body using a two-sided tape, and thereby image bearing member protecting agent 1 was configured to be attachable to the protection layer forming apparatus.

Examples 2 to 26 and Comparative Examples 1 to 7

—Production of Image Bearing Member Protecting Agents 2 to 33—

Image bearing member protecting agents 2 to 33 were produced under conditions and steps same as those of Example 1 except that primary material of protecting agents, molting temperatures, mold preheating temperatures, primary cooling temperatures and re-heating temperatures shown in Table 1 to Table 4 are used.

Endothermic peak temperatures were measured for each image bearing member protecting agent thus obtained using the following methods. The results are reported in Table 2 and Table 4.

<Measurement of Endothermic Peak Temperatures>

Endothermic peaks for each image bearing member protecting agent were measured with a differential thermal analyzer (DSC-60, manufactured by SHIMADZU CORPORATION).

Each sample, which was cut piece of each image bearing member protecting agent and was precisely measured out around 10mg using a precision electronic weighing balance having a measuring accuracy of 1/10,000 g, contained in an aluminum container equipped with a lid (sample pan), was used for the measurement. Measurements for each sample were conducted under a nitrogen stream atmosphere and at a temperature increase rate of 5° C./min, differential thermal profiles in the range of temperatures ranged from room temperature to 150° C., and endothermic peak temperatures was measured, and thereby measured values were obtained.

TABLE 1

| | Protecting Agent No. | Hydrophobic organic compound Name | Mw | Blending Qty (% by mass) | Amphiphile organic compound Name | HLB | Blending Qty (% by mass) | Other compounds Name | Blending Qty (% by mass) |
|---|---|---|---|---|---|---|---|---|---|
| Ex. 1 | 1 | Normal paraffin | 640 | 60 | Sorbitan tristearate | 1.5 | 40 | — | — |
| Ex. 2 | 2 | Normal paraffin | 640 | 75 | Sorbitan monostearate | 5.9 | 25 | — | — |
| Ex. 3 | 3 | Normal paraffin | 640 | 75 | Glyceryl monostearate | 3.5 | 25 | — | — |
| Ex. 4 | 4 | Microcry stalline wax | 700 | 60 | Sorbitan tristearate | 1.5 | 40 | — | — |
| Ex. 5 | 5 | Normal paraffin | 640 | 97 | Sorbitan tristearate | 1.5 | 3 | — | — |
| Ex. 6 | 6 | Normal paraffin | 640 | 10 | Sorbitan tristearate | 1.5 | 90 | — | — |
| Ex. 7 | 7 | Normal paraffin | 640 | 99 | Sorbitan tristearate | 1.5 | 1 | — | — |
| Ex. 8 | 8 | Normal paraffin | 640 | 5 | Sorbitan tristearate | 1.5 | 95 | — | — |
| Ex. 9 | 9 | Normal paraffin | 850 | 75 | Sorbitan monostearate | 5.9 | 25 | — | — |
| Ex. 10 | 10 | Normal paraffin | 930 | 75 | Sorbitan monopalmitate | 6.5 | 25 | — | — |
| Ex. 11 | 11 | Normal paraffin | 350 | 75 | Sorbitan monostearate | 5.9 | 25 | — | — |
| Ex. 12 | 12 | Normal paraffin | 480 | 60 | Sorbitan tristearate | 1.5 | 40 | — | — |
| Ex. 13 | 13 | Normal paraffin | 480 | 75 | Sorbitan monostearate | 5.9 | 25 | — | — |
| Ex. 14 | 14 | Normal paraffin | 640 | 45 | Sorbitan tristearate | 1.5 | 30 | Cornstarch | 25 |
| Ex. 15 | 15 | Normal paraffin | 640 | 36 | Sorbitan tristearate | 1.5 | 24 | Cornstarch | 40 |
| Ex. 16 | 16 | Normal paraffin | 300 | 75 | Sorbitan monostearate | 5.9 | 25 | — | — |

Note:
Another component: cornstarch (amylose content amount were 25% by mass)

TABLE 2

| | Protecting Agent No. | Endothermic peak Temperature (° C.) | Manufacturing condition Melting temperature (° C.) | Mold preheating temperature (° C.) | Primary cooling temperature (° C.) | Reheating temperature (° C.) | Reheating holding time (min) | Final cooling temperature (° C.) |
|---|---|---|---|---|---|---|---|---|
| Ex. 1 | 1 | 56/88 | 120 | 85 | 50 | 60 | 20 | 25 |
| Ex. 2 | 2 | 53/88 | 120 | 85 | 50 | 60 | 20 | 25 |
| Ex. 3 | 3 | 57/88 | 120 | 85 | 50 | 60 | 20 | 25 |
| Ex. 4 | 4 | 56/95 | 120 | 90 | 50 | 60 | 20 | 25 |
| Ex. 5 | 5 | 56/88 | 120 | 85 | 50 | 60 | 20 | 25 |
| Ex. 6 | 6 | 56/88 | 120 | 85 | 50 | 60 | 20 | 25 |
| Ex. 7 | 7 | 88 | 120 | 85 | 50 | 60 | 20 | 25 |
| Ex. 8 | 8 | 56 | 120 | 85 | 50 | 60 | 20 | 25 |
| Ex. 9 | 9 | 57/110 | 150 | 105 | 50 | 60 | 20 | 25 |
| Ex. 10 | 10 | 48/125 | 160 | 120 | 40 | 55 | 20 | 25 |
| Ex. 11 | 11 | 48 | 80 | 45 | — | — | — | 25 |
| Ex. 12 | 12 | 56/70 | 100 | 65 | 45 | 60 | 20 | 25 |
| Ex. 13 | 13 | 53/70 | 100 | 65 | 45 | 60 | 20 | 25 |
| Ex. 14 | 14 | 56/88 | 120 | 85 | 50 | 60 | 20 | 25 |
| Ex. 15 | 15 | 56/88 | 120 | 85 | 50 | 60 | 20 | 25 |
| Ex. 16 | 16 | 43/53 | 100 | 50 | 35 | 45 | 20 | 25 |

TABLE 3

| | Protecting Agent No. | Hydrophobic organic compound Name | Mw | Blending Qty (% by mass) | Amphiphile organic compound Name | HLB | Blending Qty (% by mass) |
|---|---|---|---|---|---|---|---|
| Ex. 17 | 17 | Isoparaffin wax | 700 | 60 | Sorbitan tristearate | 1.5 | 40 |
| Ex. 18 | 18 | Propylene-Isoprene (95/5) copolymer | 680 | 60 | Sorbitan tristearate | 1.5 | 40 |
| Ex. 19 | 19 | Normal paraffin | 640 | 75 | Sorbitan monoisostearate | 3.2 | 25 |
| Ex. 20 | 20 | Normal paraffin | 640 | 75 | Sorbitan monopalmitate | 6.5 | 25 |
| Ex. 21 | 21 | Normal paraffin | 640 | 75 | Sorbitan monomelissicate | 3.2 | 25 |
| Ex. 22 | 22 | Normal paraffin | 640 | 75 | Sorbitan trimyristate | 2.9 | 25 |
| Ex. 23 | 23 | Normal paraffin | 640 | 75 | Sorbitan monotetracontanoate | 1.7 | 25 |
| Ex. 24 | 24 | Normal paraffin | 640 | 75 | Aluminum stearate | <0.1 | 25 |

TABLE 3-continued

| | | Hydrophobic organic compound | | | Amphiphile organic compound | | |
|---|---|---|---|---|---|---|---|
| | Protecting Agent No. | Name | Mw | Blending Qty (% by mass) | Name | HLB | Blending Qty (% by mass) |
| Ex. 25 | 25 | Normal paraffin | 640 | 75 | Glyceryl monomelissicate | 0.8 | 25 |
| Ex. 26 | 26 | Normal paraffin | 640 | 75 | Sorbitan monopentadecylate | 6.8 | 25 |
| Comp. Ex. 1 | 27 | Normal paraffin | 640 | 100 | — | — | — |
| Comp. Ex. 2 | 28 | Microcry stalline wax | 700 | 100 | — | — | — |
| Comp. Ex. 3 | 29 | — | — | — | Sorbitan tristearate | 1.5 | 100 |
| Comp. Ex. 4 | 30 | — | — | — | Sorbitan monostearate | 5.9 | 100 |
| Comp. Ex. 5 | 31 | — | — | — | Glyceryl monostearate | 3.5 | 100 |
| Comp. Ex. 6 | 32 | — | — | — | Zinc stearate | 1.2 | 100 |
| Comp. Ex. 7 | 33 | — | — | — | Higher alcohol (Average carbon number of 50) | <0.1 | 100 |

TABLE 4

| | | | Manufacturing condition | | | | | |
|---|---|---|---|---|---|---|---|---|
| | Protecting Agent No. | Endothermic peak Temperature (° C.) | Melting temperature (° C.) | Mold preheating temperature (° C.) | Primary cooling temperature (° C.) | Reheating temperature (° C.) | Reheating holding time (min) | Final cooling temperature (° C.) |
| Ex. 17 | 17 | 75 | 110 | 70 | 50 | 60 | 20 | 25 |
| Ex. 18 | 18 | 56/88 | 120 | 85 | 50 | 60 | 20 | 25 |
| Ex. 19 | 19 | 53/88 | 120 | 85 | 50 | 60 | 20 | 25 |
| Ex. 20 | 20 | 48/88 | 120 | 85 | 40 | 50 | 20 | 25 |
| Ex. 21 | 21 | 89 | 120 | 85 | 55 | 65 | 20 | 25 |
| Ex. 22 | 22 | 54/84 | 120 | 85 | 40 | 50 | 20 | 25 |
| Ex. 23 | 23 | 89/100 | 130 | 95 | — | — | — | 25 |
| Ex. 24 | 24 | 88/100 | 130 | 95 | — | — | — | 25 |
| Ex. 25 | 25 | 89 | 120 | 85 | — | — | — | 25 |
| Ex. 26 | 26 | 88/110 | 150 | 105 | — | — | — | 25 |
| Comp. Ex. 1 | 27 | 88 | 120 | 85 | — | — | — | 25 |
| Comp. Ex. 2 | 28 | 95 | 130 | 90 | — | — | — | 25 |
| Comp. Ex. 3 | 29 | 56 | 90 | 50 | — | — | — | 25 |
| Comp. Ex. 4 | 30 | 53 | 90 | 50 | — | — | — | 25 |
| Comp. Ex. 5 | 31 | 57 | 90 | 50 | — | — | — | 25 |
| Comp. Ex. 6 | 32 | 140 | 180 | 130 | — | — | — | 25 |
| Comp. Ex. 7 | 33 | 80 | 120 | 75 | — | — | — | 25 |

Example 27

A process cartridge was composed of an image bearing member (or a photoconductor) having a surface layer thereon containing thermosetting resin (heat radical reactivity polyfunctional acrylic resin) and having thickness of 5 μm and a transferring unit, and the process cartridge further included a transfer unit, a counter type cleaning blade, a brush-shaped protecting agent supply member and a trailing-blade type protection layer forming member, which were arranged in an upstream order of the rotation direction of the image bearing member. The process cartridge also contained a protection layer forming apparatus that uses the image bearing member protecting agent 1 of Example 1.

The process cartridge thus configured was attached to an image forming apparatus (Color MFP imagio Neo C600, manufactured by Ricoh Company, Ltd.) modified so that the process cartridge can be attached, and a continuous image output test outputting 100,000 sheets of A4 size paper having 6% of image/letter coverage proportion was conducted. Occurrences of abnormal images before and after the test were examined under a normal-temperature/normal-humidity environment wherein temperature was at 20° C. and relative humidity was at 50% RH, under a low-humidity/low-temperature environment wherein temperature was at 10° C. and relative humidity was at 25% RH, and under a high-humidity/high-temperature environment wherein temperature was at 35° C. and relative humidity was at 80% RH.

For the test, toner, produced through a polymerization process, particles thereof having the mass average particle diameter (D4) of 5.2 μm, the number-average particle diameter (D1) of 4.5 μm, the ratio of the mass average particle diameter (D4) to the number-average particle diameter (D1), or D4/D1, of 1.16, and the average degree of circularity of 0.98, was used.

Occurrences of cleanability related linear image failures, and occurrences of cleanability related uneven halftone images, background portion fogging and grainy images, were evaluated using the following evaluation criteria for the abnormal image examination.

<Criteria for the Evaluation on Linear Image Failures>

A: Excellent

B: No problem from a practical standpoint

C: Allowable to use from a practical standpoint

D: Unallowable to use

<Criteria for Evaluation on Occurrences of Uneven Halftone Images>

A: Excellent

B: No problem from a practical standpoint

C: Allowable to use from a practical standpoint

D: Unallowable to use

<Criteria for the Evaluation on Occurrences of Background Portion Fogging>

A: Excellent

B: No problem from a practical standpoint

C: Allowable to use from a practical standpoint

D: Unallowable to use

<Criteria for the Evaluation on Occurrences of Grainy Images>

A: Excellent

B: No problem from a practical standpoint

C: Allowable to use from a practical standpoint

D: Unallowable to use Furthermore, in order to evaluate the effect of the deterioration of the image bearing member, the cleaning member and the charge member on images, conditions and abnormality of each member were observed before and after conducting the output of 100,000 sheets, and observation results were evaluated with the following criteria.

<Criteria for the Evaluation on the Conditions of Each Member>

A: Conditions are the same as the beginning

B: Some deterioration was recognized (allowable to use from a practical standpoint)

C: Deterioration was recognized

As a result, deterioration of each member occurring with an increase in the number of sheets outputted was not recognized, and excellent quality images were obtained before and after conducting the output of 100,000 sheets, and thereby the image forming apparatus of the present invention turned out to be effective for both maintaining image quality and extending device life duration.

The evaluation results of each image quality are shown in Table 5 to Table 10, and the observation results of the degradation condition for each member are shown in Table 11.

Moreover, the image forming apparatus of Example 27 was successively used for another continuous image output test outputting 400,000 more sheets (totaled 500,000 sheets including the sheets outputted in the previous test), the effect on images was not recognized, and almost no deterioration of the image bearing member, the cleaning member and the charge member was recognized.

Examples 28 to 52

Evaluations were conducted under the same conditions as those of Example 27 except image bearing member protecting agents 2 to 26 were used instead of the image bearing member protecting agent 1 of Example 27.

The evaluation results of each image quality are shown in Table 5 to Table 10, and the observation results of the degradation condition for each member are shown in Table 11.

Moreover, the image forming apparatus of Example 28 was successively used for another continuous image output test outputting 400,000 more sheets (totaled 500,000 sheets including the sheets outputted in the previous test), the effect on images was not recognized, and almost no deterioration of the image bearing member, the cleaning member and the charge member was recognized.

Comparative Examples 8 to 14

Evaluations were conducted under the same conditions as those of Example 27 except image bearing member protecting agents 27 to 33 were used instead of the image bearing member protecting agent 1 of Example 27.

The evaluation results of each image quality are shown in Table 5 to Table 10, and the observation results of the degradation condition for each member are shown in Table 11.

Example 53

A process cartridge was composed of an image bearing member (or a photoconductor) having a surface layer thereon containing thermosetting resin (heat radical reactivity polyfunctional acrylic resin) and having thickness of 5 μm, a brush-shaped protecting agent supply member and a counter type protection layer forming member combined with a cleaning blade which were arranged in this order in an upstream order of the rotation direction of the image bearing member, following to a transferring unit. The process cartridge also contains a protection layer forming apparatus that uses the image bearing member protecting agent 1 of Example 1.

The process cartridge thus obtained was attached to an image forming apparatus (Color MFP imagio Neo C6455, manufactured by Ricoh Company, Ltd.) modified so that the process cartridge can be attached, and a continuous image output test outputting 100,000 sheets of A4 size paper having 6% of image/letter coverage proportion was conducted.

For the test, toner, produced through a polymerization process, particles thereof having the mass average particle diameter (D4) of 5.2 μm, the number-average particle diameter (D1) of 4.5 μm, the ratio of the mass average particle diameter (D4) to the number-average particle diameter (D1), or D4/D1, of 1.16, and the average degree of circularity of 0.98, was used.

As in the case of Example 27, occurrences of cleanability related linear image failures, and occurrences of cleanability related uneven halftone images, background portion fogging and grainy images, were evaluated.

Furthermore, as in the case of Example 27, in order to evaluate the effect of the deterioration of the image bearing member, the cleaning member and the charge member on images, conditions and abnormality of each member were observed before and after conducting an output of 100,000 sheets.

The evaluation results of each image quality are shown in Table 5 to Table 10, and the observation results of the degradation condition for each member are shown in Table 11.

Example 54

Evaluations were conducted under the same conditions as those of Example 27 except the protecting agent supply member was detached and image bearing member protecting agent was supplied directly to the image bearing member through directly applying the protecting agent on the surface thereof while pressure was given.

The evaluation results of each image quality are shown in Table 5 to Table 10, and the observation results of the degradation condition for each member are shown in Table 11.

Example 55

Evaluations were conducted under the same conditions as those of Example 27 except image bearing member containing no thermosetting resin (heat radical reactivity polyfunctional acrylic resin) in the surface layer thereof was used.

The evaluation results of each image quality are shown in Table 5 to Table 10, and the observation results of the degradation condition for each member are shown in Table 11.

Example 56

Evaluations were conducted under the same conditions as those of Example 27 except toner, produced through a polymerization process, particles thereof having the mass average particle diameter (D4) of 6.0 μm, the number-average particle diameter (D1) of 5.3 μm, the ratio of the mass average particle diameter (D4) to the number-average particle diameter (D1), or D4/D1, of 1.13, and the average degree of circularity of 0.90, was used.

The evaluation results of each image quality are shown in Table 5 to Table 10, and the observation results of the degradation condition for each member are shown in Table 11.

Example 57

Evaluations were conducted under the same conditions as those of Example 27 except toner, produced through a polymerization process, particles thereof having the mass average particle diameter (D4) of 5.4 μm, the number-average particle diameter (D1) of 3.5 μm, the ratio of the mass average particle diameter (D4) to the number-average particle diameter (D1), or D4/D1, of 1.54, and the average degree of circularity of 0.98, was used.

The evaluation results of each image quality are shown in Table 5 to Table 10, and the observation results of the degradation condition for each member are shown in Table 11.

TABLE 5

*Image smears caused by cleaning failures were recognized in Comparative Examples 8 and 9.

| | | Beginning Image quality (under normal temperature/normal humidity) | | | |
|---|---|---|---|---|---|
| | Protecting Agent No. | Linear image | uneven halftone image | Background portion fogging | Grainy image |
| Ex. 27 | 1 | A | A | A | A |
| Ex. 28 | 2 | A | A | A | A |
| Ex. 29 | 3 | A | A | A | A |
| Ex. 30 | 4 | A | A | A | A |
| Ex. 31 | 5 | A | A | A | A |
| Ex. 32 | 6 | A | A | A | A |
| Ex. 33 | 7 | A | A | A | A |
| Ex. 34 | 8 | A | A | A | A |
| Ex. 35 | 9 | A | A | A | A |
| Ex. 36 | 10 | A | A | A | A |
| Ex. 37 | 11 | A | A | A | A |
| Ex. 38 | 12 | A | A | A | A |
| Ex. 39 | 13 | A | A | A | A |
| Ex. 40 | 14 | B | B | A | A |
| Ex. 41 | 15 | B | B | B | A |
| Ex. 42 | 16 | A | A | A | A |
| Ex. 43 | 17 | A | A | A | A |
| Ex. 44 | 18 | A | B | A | A |
| Ex. 45 | 19 | A | A | A | A |
| Ex. 46 | 20 | A | A | A | A |
| Ex. 47 | 21 | A | A | A | A |
| Ex. 48 | 22 | A | A | A | A |
| Ex. 49 | 23 | A | B | A | A |
| Ex. 50 | 24 | A | A | A | A |
| Ex. 51 | 25 | A | A | A | A |
| Ex. 52 | 26 | A | A | A | A |
| Ex. 53 | 1 | A | A | A | A |
| Ex. 54 | 1 | A | A | A | A |
| Ex. 55 | 1 | A | A | A | A |
| Ex. 56 | 1 | A | A | A | A |
| Ex. 57 | 1 | A | A | B | A |
| Comp. Ex. 8 | 27 | C | B | B | A |
| Comp. Ex. 9 | 28 | C | B | B | A |
| Comp. Ex. 10 | 29 | A | A | A | A |
| Comp. Ex. 11 | 30 | A | A | A | A |
| Comp. Ex. 12 | 31 | A | A | A | A |
| Comp. Ex. 13 | 32 | A | A | A | A |
| Comp. Ex. 14 | 33 | B | A | A | A |

TABLE 6

*Image smears caused by cleaning failures were recognized in Comparative Examples 8 and 9.

| | | Beginning Image quality (under low temerature/low humidity) | | | |
|---|---|---|---|---|---|
| | Protecting Agent No. | Linear image | Uneven halftone image | Background portion fogging | Grainy image |
| Ex. 27 | 1 | A | A | A | A |
| Ex. 28 | 2 | A | A | A | A |
| Ex. 29 | 3 | A | A | A | A |
| Ex. 30 | 4 | A | A | A | A |
| Ex. 31 | 5 | A | A | A | A |
| Ex. 32 | 6 | A | A | A | A |
| Ex. 33 | 7 | A | A | A | A |
| Ex. 34 | 8 | A | A | A | A |
| Ex. 35 | 9 | A | A | A | A |
| Ex. 36 | 10 | A | B | A | A |
| Ex. 37 | 11 | A | A | A | A |
| Ex. 38 | 12 | A | A | A | A |
| Ex. 39 | 13 | A | A | A | A |
| Ex. 40 | 14 | B | B | A | A |
| Ex. 41 | 15 | B | B | A | A |
| Ex. 42 | 16 | A | A | A | A |
| Ex. 43 | 17 | A | A | A | A |
| Ex. 44 | 18 | A | A | A | A |
| Ex. 45 | 19 | A | A | A | A |
| Ex. 46 | 20 | A | A | A | A |
| Ex. 47 | 21 | A | A | A | A |
| Ex. 48 | 22 | A | A | A | A |
| Ex. 49 | 23 | A | B | A | A |
| Ex. 50 | 24 | A | B | A | A |
| Ex. 51 | 25 | A | A | A | A |
| Ex. 52 | 26 | A | A | A | A |
| Ex. 53 | 1 | A | A | A | A |
| Ex. 54 | 1 | B | B | A | A |
| Ex. 55 | 1 | A | A | A | A |
| Ex. 56 | 1 | A | A | A | A |
| Ex. 57 | 1 | A | A | A | A |
| Comp. Ex. 8 | 27 | C | B | A | A |
| Comp. Ex. 9 | 28 | D | B | A | A |
| Comp. Ex. 10 | 29 | B | B | A | A |
| Comp. Ex. 11 | 30 | C | B | A | A |
| Comp. Ex. 12 | 31 | B | A | A | A |
| Comp. Ex. 13 | 32 | B | A | A | A |
| Comp. Ex. 14 | 33 | C | A | A | A |

TABLE 7

*Image smears caused by cleaning failures were recognized in Comparative Examples 8 and 9.

| | | Beginning Image quality (under high temperature/high humidity) | | | |
|---|---|---|---|---|---|
| | Protecting Agent No. | Linear image | uneven halftone image | Background portion fogging | Grainy image |
| Ex. 27 | 1 | A | A | A | A |
| Ex. 28 | 2 | A | A | A | A |
| Ex. 29 | 3 | A | A | A | A |
| Ex. 30 | 4 | A | A | A | A |
| Ex. 31 | 5 | A | A | A | A |
| Ex. 32 | 6 | A | A | A | A |
| Ex. 33 | 7 | A | A | A | A |
| Ex. 34 | 8 | A | A | A | A |
| Ex. 35 | 9 | A | A | A | A |
| Ex. 36 | 10 | A | A | A | A |
| Ex. 37 | 11 | A | B | A | A |
| Ex. 38 | 12 | A | A | A | A |
| Ex. 39 | 13 | A | A | A | B |
| Ex. 40 | 14 | A | B | B | B |
| Ex. 41 | 15 | A | B | B | B |
| Ex. 42 | 16 | A | B | B | A |
| Ex. 43 | 17 | A | A | A | A |
| Ex. 44 | 18 | A | B | A | A |
| Ex. 45 | 19 | A | A | A | A |
| Ex. 46 | 20 | A | A | A | A |
| Ex. 47 | 21 | A | A | A | A |
| Ex. 48 | 22 | A | A | A | A |
| Ex. 49 | 23 | A | A | A | A |
| Ex. 50 | 24 | A | A | A | B |
| Ex. 51 | 25 | A | A | A | A |
| Ex. 52 | 26 | A | A | A | B |
| Ex. 53 | 1 | A | A | A | A |
| Ex. 54 | 1 | A | A | A | A |
| Ex. 55 | 1 | A | A | A | A |
| Ex. 56 | 1 | A | A | A | A |
| Ex. 57 | 1 | A | A | B | A |
| Comp. Ex. 8 | 27 | B | B | A | A |
| Comp. Ex. 9 | 28 | B | B | A | A |
| Comp. Ex. 10 | 29 | A | A | A | A |
| Comp. Ex. 11 | 30 | A | A | A | B |
| Comp. Ex. 12 | 31 | A | A | A | B |
| Comp. Ex. 13 | 32 | A | A | A | A |
| Comp. Ex. 14 | 33 | B | A | A | A |

TABLE 8

*Anomaly in right and left image densities was recognized in Example 55.

| | | After output of 100,000 sheets Image quality (under normal temperature/normal humidity) | | | |
|---|---|---|---|---|---|
| | Protecting Agent No. | Linear image | Uneven halftone image | Background portion fogging | Grainy image |
| Ex. 27 | 1 | A | A | A | A |
| Ex. 28 | 2 | A | A | A | A |
| Ex. 29 | 3 | A | A | A | A |
| Ex. 30 | 4 | A | A | A | A |
| Ex. 31 | 5 | A | A | A | A |
| Ex. 32 | 6 | A | A | A | A |
| Ex. 33 | 7 | A | A | A | A |
| Ex. 34 | 8 | B | A | A | A |
| Ex. 35 | 9 | A | A | A | A |
| Ex. 36 | 10 | A | A | A | A |
| Ex. 37 | 11 | A | B | B | A |
| Ex. 38 | 12 | A | A | A | A |
| Ex. 39 | 13 | A | A | A | A |
| Ex. 40 | 14 | B | B | B | B |

TABLE 8-continued

*Anomaly in right and left image densities was recognized in Example 55.

| | | After output of 100,000 sheets Image quality (under normal temperature/normal humidity) | | | |
|---|---|---|---|---|---|
| | Protecting Agent No. | Linear image | Uneven halftone image | Background portion fogging | Grainy image |
| Ex. 41 | 15 | C | C | C | B |
| Ex. 42 | 16 | A | B | C | A |
| Ex. 43 | 17 | A | A | A | A |
| Ex. 44 | 18 | A | C | A | A |
| Ex. 45 | 19 | A | A | A | A |
| Ex. 46 | 20 | A | A | A | A |
| Ex. 47 | 21 | A | A | A | A |
| Ex. 48 | 22 | A | B | C | A |
| Ex. 49 | 23 | A | B | A | A |
| Ex. 50 | 24 | A | B | A | A |
| Ex. 51 | 25 | B | C | A | A |
| Ex. 52 | 26 | A | A | A | B |
| Ex. 53 | 1 | A | A | A | A |
| Ex. 54 | 1 | A | A | A | A |
| Ex. 55 | 1 | A | A | A | A |
| Ex. 56 | 1 | A | B | A | A |
| Ex. 57 | 1 | B | A | B | A |
| Comp. Ex. 8 | 27 | D | C | B | B |
| Comp. Ex. 9 | 28 | D | B | B | B |
| Comp. Ex. 10 | 29 | D | B | A | A |
| Comp. Ex. 11 | 30 | C | B | A | C |
| Comp. Ex. 12 | 31 | D | C | C | A |
| Comp. Ex. 13 | 32 | D | C | A | A |
| Comp. Ex. 14 | 33 | D | C | A | A |

TABLE 9

*Anomaly in right and left image densities was recognized in Example 55.

| | | After output of 100,000 sheets Image quality (under low temperature/low humidity) | | | |
|---|---|---|---|---|---|
| | Protecting Agent No. | Linear image | Uneven halftone image | Background portion fogging | Grainy image |
| Ex. 27 | 1 | A | A | A | A |
| Ex. 28 | 2 | A | A | A | A |
| Ex. 29 | 3 | A | A | A | A |
| Ex. 30 | 4 | A | A | A | A |
| Ex. 31 | 5 | A | A | A | A |
| Ex. 32 | 6 | A | A | A | A |
| Ex. 33 | 7 | A | A | A | A |
| Ex. 34 | 8 | B | A | A | A |
| Ex. 35 | 9 | A | A | A | A |
| Ex. 36 | 10 | B | C | A | A |
| Ex. 37 | 11 | A | B | B | A |
| Ex. 38 | 12 | A | A | A | A |
| Ex. 39 | 13 | A | A | A | A |
| Ex. 40 | 14 | C | B | A | A |
| Ex. 41 | 15 | C | C | B | A |
| Ex. 42 | 16 | A | B | B | A |
| Ex. 43 | 17 | A | A | A | A |
| Ex. 44 | 18 | A | A | A | A |
| Ex. 45 | 19 | B | B | B | A |
| Ex. 46 | 20 | A | A | A | A |
| Ex. 47 | 21 | A | A | A | A |
| Ex. 48 | 22 | A | A | A | A |
| Ex. 49 | 23 | B | B | A | A |
| Ex. 50 | 24 | A | C | A | A |
| Ex. 51 | 25 | C | C | A | A |
| Ex. 52 | 26 | A | B | A | A |
| Ex. 53 | 1 | B | A | A | A |
| Ex. 54 | 1 | C | B | A | A |

TABLE 9-continued

*Anomaly in right and left image densities was recognized in Example 55.

| | | After output of 100,000 sheets Image quality (under low temperature/low humidity) | | | |
|---|---|---|---|---|---|
| | Protecting Agent No. | Linear image | Uneven halftone image | Background portion fogging | Grainy image |
| Ex. 55 | 1 | A | B | A | A |
| Ex. 56 | 1 | A | B | A | A |
| Ex. 57 | 1 | B | A | A | A |
| Comp. Ex. 8 | 27 | D | C | B | A |
| Comp. Ex. 9 | 28 | D | C | B | A |
| Comp. Ex. 10 | 29 | D | D | A | A |
| Comp. Ex. 11 | 30 | D | C | A | A |
| Comp. Ex. 12 | 31 | D | C | C | A |
| Comp. Ex. 13 | 32 | D | D | A | A |
| Comp. Ex. 14 | 33 | D | D | B | B |

TABLE 10

*Anomaly in right and left image densities was recognized in Example 55.

| | | After output of 100,000 sheets Image quality (under low temperature/low humidity) | | | |
|---|---|---|---|---|---|
| | Protecting Agent No. | Linear image | uneven halftone image | Background portion fogging | Grainy image |
| Ex. 27 | 1 | A | A | A | A |
| Ex. 28 | 2 | A | A | A | A |
| Ex. 29 | 3 | A | A | A | A |
| Ex. 30 | 4 | A | A | A | A |
| Ex. 31 | 5 | A | A | A | B |
| Ex. 32 | 6 | A | A | A | B |
| Ex. 33 | 7 | A | A | A | C |
| Ex. 34 | 8 | A | A | A | B |
| Ex. 35 | 9 | A | A | A | A |
| Ex. 36 | 10 | A | A | A | A |
| Ex. 37 | 11 | A | C | B | A |
| Ex. 38 | 12 | A | A | A | B |
| Ex. 39 | 13 | A | A | A | C |
| Ex. 40 | 14 | B | B | C | C |
| Ex. 41 | 15 | B | C | C | C |
| Ex. 42 | 16 | A | C | C | A |
| Ex. 43 | 17 | A | B | A | B |
| Ex. 44 | 18 | A | C | A | A |
| Ex. 45 | 19 | A | A | A | A |
| Ex. 46 | 20 | A | A | A | A |
| Ex. 47 | 21 | A | A | A | A |
| Ex. 48 | 22 | A | B | C | C |
| Ex. 49 | 23 | A | A | A | A |
| Ex. 50 | 24 | A | B | B | C |
| Ex. 51 | 25 | A | B | A | B |
| Ex. 52 | 26 | A | B | B | C |
| Ex. 53 | 1 | A | A | A | A |
| Ex. 54 | 1 | A | A | A | A |
| Ex. 55 | 1 | A | B | A | A |
| Ex. 56 | 1 | A | B | A | A |
| Ex. 57 | 1 | A | A | C | A |
| Comp. Ex. 8 | 27 | B | C | B | C |
| Comp. Ex. 9 | 28 | B | D | B | C |
| Comp. Ex. 10 | 29 | C | B | D | B |
| Comp. Ex. 11 | 30 | B | C | A | D |
| Comp. Ex. 12 | 31 | B | D | A | D |
| Comp. Ex. 13 | 32 | C | B | B | C |
| Comp. Ex. 14 | 33 | C | C | C | D |

TABLE 11

| | | After output of 100,000 sheets | | |
|---|---|---|---|---|
| | ProteBting Agent No. | Image Aearing memAer | Bleaning memAer | Bharge memAer |
| Ex. 27 | 1 | A | A | A |
| Ex. 28 | 2 | A | A | A |
| Ex. 29 | 3 | A | A | A |
| Ex. 30 | 4 | A | A | A |
| Ex. 31 | 5 | A | A | A |
| Ex. 32 | 6 | A | A | A |
| Ex. 33 | 7 | A | B | A |
| Ex. 34 | 8 | B | A | A |
| Ex. 35 | 9 | A | A | A |
| Ex. 36 | 10 | B | B | A |
| Ex. 37 | 11 | B | A | A |
| Ex. 38 | 12 | A | A | A |
| Ex. 39 | 13 | B | A | A |
| Ex. 40 | 14 | B | A | A |
| Ex. 41 | 15 | B | B | B |
| Ex. 42 | 16 | B | B | A |
| Ex. 43 | 17 | B | A | A |
| Ex. 44 | 18 | B | A | A |
| Ex. 45 | 19 | B | B | A |
| Ex. 46 | 20 | A | A | A |
| Ex. 47 | 21 | A | A | A |
| Ex. 48 | 22 | B | A | A |
| Ex. 49 | 23 | B | B | A |
| Ex. 50 | 24 | B | B | B |
| Ex. 51 | 25 | B | B | A |
| Ex. 52 | 26 | B | B | B |
| Ex. 53 | 27 | A | A | A |
| Ex. 54 | 28 | B | A | A |
| Ex. 55 | 29 | B | A | A |
| Ex. 56 | 30 | A | A | A |
| Ex. 57 | 31 | A | A | B |
| Bomp. Ex. 8 | 27 | C | B | C |
| Bomp. Ex. 9 | 28 | C | C | B |
| Bomp. Ex. 10 | 29 | C | B | A |
| Bomp. Ex. 11 | 30 | C | B | B |
| Bomp. Ex. 12 | 31 | C | A | C |
| Bomp. Ex. 13 | 32 | C | C | C |
| Bomp. Ex. 14 | 33 | C | C | C |

From the results shown in Table 5 to Table 11, the image bearing member using the protecting agents of the present invention and of Examples 27 to 57 should be recognized as to provide better image quality with fewer occurrences of linear image failures, uneven halftone images, background portion fogging and grainy images and having much less deterioration of image bearing member, cleaning member and charge member occurring with an increase in the number of sheets outputted, compared with Comparative Examples 8 to 14.

As in Example 33 (Protecting Agent No. 7) and Example 34 (Protecting Agent No. 8), when the mass ratio of the mixture of the hydrophobic organic compounds and amphiphile organic compounds is out of the range of 10/90 to 97/3, almost no effect on images was recognized, but small tendency of deterioration of image bearing member and cleaning member was recognized.

Almost no effect on the images under a normal-temperature/normal-humidity environment was recognized for Example 36 (Protecting Agent No. 10) and Example 37 (Protecting Agent No. 11) having their endothermic peak temperatures at the range out of 50° C. to 120° C., but little more unevenness in the coating condition of the image bearing member protecting agent was recognized for Examples 36 and 37, and accompanying little more unevenness of halftone images was recognized under a low-humidity/low-temperature environment or a high-humidity/high-temperature environment, compared with Example 27 and Example 35 having their endothermic peak temperatures at the range of 50° C. to 120°.

Under a high-humidity/high-temperature environment, little more occurrence of grainy images was recognized for Example 38 (Protecting Agent No. 12) and Example 39 (Protecting Agent No. 13) having the single endothermic peak temperature respectively, compared with Examples 27 to 32, Example 35 and 36 (Protecting Agents No. 1 to 6, Protecting Agent No. 9 and Protecting Agent No. 10) having more than one endothermic peak temperatures in the range of 40° C. to 70° C. as well as in the range of 80° C. to 130° C.

Example 27 (Protecting Agent No. 1) was compared with Example 40 (Protecting Agent No. 14) and Example 41 (Protecting Agent No. 15), all having different content rates of hydrophobic organic compounds and amphiphile organic compound. From the result, the lower content rates of hydrophobic organic compounds and amphiphile organic compounds are, the lower performance of the image bearing member protecting agent is, and when the content rates are less than 75% by mass, sharp degradation of performance, particularly in image quality, but except protection effect protecting the image bearing member from an electrical stress, was recognized.

Example 27 (Protecting Agent No. 1) was compared with Examples 35 to 37 (Protecting Agents No. 9 to 11) sharing the same compositions of Example 27 except that the weight-average molecular weight (Mw) of hydrophobic organic compounds is different in Example 27 and Examples 35 to 37. From the result, when the weight-average molecular weight (Mw) of the hydrophobic organic compound is either too small or too large, tendency of little increase of surface-layer wear-volume of the image bearing member was recognized.

Example 43 (Protecting Agent No. 17) having no normal paraffins of hydrophobic organic compounds was compared with Example 27 (Protecting Agent No. 1) having normal paraffins of hydrophobic organic compounds and having the same other compositions as those of Examples 43. From the result, little more occurrence of uneven halftone images was recognized for Example 43 under a high-humidity/high-temperature environment, and little lower removal performance for removing protecting agent deteriorated components was recognized.

Example 44 (Protecting Agent No. 18) whose hydrophobic organic compounds are unsaturated chain hydrocarbons was compared with Example 27 (Protecting Agent No. 1) whose hydrophobic organic compounds are normal paraffins and having the same other compositions as those of Examples 44. From the result, little more occurrence of fine smears on the surface of the image bearing member and little more abrasion on the edge parts of the cleaning member were recognized for Example 44. Furthermore, accompanying little more occurrence of uneven halftone images was recognized, and thereby little more decrease of stability over time of the protection layer was confirmed.

Example 45 (protecting agent 19) having the amphiphile organic compound containing lipophilic groups was compared with branched-structures with Example 27 (protecting agent 1) having the amphiphile organic compound whose lipophilic groups are linear alkyls and having the same other compositions as those of Examples 27. From the result, little more surface-layer wear volume of the image bearing member and little lower image bearing member protection effect were recognized for Example 45.

Examples 46 to 49 (Protecting Agents No. 20 to 23) was compared with Examples 27 to 30 (Protecting Agents No. 1 to 4) having different numbers of carbon atoms of lipophilic groups contained in the amphiphile organic compound. From the result, when the number of carbon atoms was too large, little more occurrence of protecting agent coating unevenness considered to be caused by an uneven dispersion state of the amphiphile organic compounds of the image bearing member protecting agent was recognized. Furthermore, when the number of carbon atoms was too small, occurrence of image bearing member filming considered to be caused by excessively excellent phase dissolution with the hydrophobic organic compounds was recognized. Thereby, in either case, appearance of effect on images was recognized. Moreover, from comparison between Example 50 (Protecting Agent No. 24) and Example 27 (Protecting Agent No. 1) containing an anion surfactant respectively, it should be noted that, even when the anion surfactant was used, somewhat more occurrence of grainy images was recognized under a high-humidity/high-temperature environment while the protection effect protecting the image bearing member from electrical stresses was recognized.

Examples 51 to 52 (Protecting Agents No. 25 to 26) containing the amphiphile organic compounds having a different HLB (hydrophile-lipophile balance) value from with Example 28 (Protecting Agent No. 2) having the same components as of Examples 51 to 52 except the amphiphile organic compound. From the result, when the HLB value is either small or large, somewhat more occurrence of grainy images and somewhat more occurrence of cleaning member edge abrasion were recognized under a high-humidity/high-temperature environment while the protection effect protecting the image bearing member from electrical stresses was recognized.

By contrast, in Comparative Examples 8 to 14 using Protecting Agents 27 to 33 that do not satisfy the standard of the present invention as image bearing member protecting agents, the protection effect on the image bearing member was not recognized, while image quality was kept against electrical stresses applied on the image bearing member.

The image bearing member protecting agent of the present invention and the protection layer forming apparatus of the present invention can protect the image bearing member from electrical stresses generated from, for example, charging, and mechanical stresses generated from, for example, friction with the cleaning member while deteriorated protecting agents thereof deteriorated through the electrical stresses can hardly affect image quality and the surrounding members of the image bearing member, and thus are preferably used for an image forming method, an image forming apparatus, and a process cartridge of the electrophotographic system.

What is claimed is:

1. An image bearing member protecting agent, comprising: a hydrophobic organic compound and an amphiphile organic compound, wherein the weight-average molecular weight of the hydrophobic organic compound is in the range of from 350 to 850, the hydrophobic organic compound is a hydrocarbon wax selected from the group consisting of a normal paraffin, an isoparaffin, and a cycloparaffin, and the total content of the hydrophobic organic compound and the amphiphile organic compound is in the range of 75% by mass to 100% by mass to the total mass of the image bearing member protecting agent.

2. The image bearing member protecting agent according to claim 1, wherein the hydrophobic organic compound comprises a normal paraffin.

3. The image bearing member protecting agent according to claim 1, wherein the amphiphile organic compound comprises a nonionic surface active surfactant.

4. The image bearing member protecting agent according to claim 3, wherein the nonionic surface active surfactant is an esterified compound of an alkyl carboxylic acid represented by formula (1) and a polyalcohol:

$$C_nH_{2n+1}COOH \quad (1)$$

where "n" represents an integer of 15 to 35.

5. The image bearing member protecting agent according to claim 4, wherein the alkyl carboxylic acid is a straight-chain alkyl carboxylic acid.

6. The image bearing member protecting agent according to claim 1, wherein the hydrophile-lipophile balance value of the amphiphile organic compound is in the range of 1.0 to 6.5.

7. The image bearing member protecting agent according to claim 1, wherein the mass ratio of the mixture of the hydrophobic organic compound (A) to the amphiphile organic compound (B), or (A):(B), is in the range of 10:90 to 97:3.

8. The image bearing member protecting agent according to claim 1, wherein the image bearing member protecting agent has at least one endothermic peak temperature in the range of from 50° C. to 130° C.

9. The image bearing member protecting agent according to claim 1, wherein the image bearing member protecting agent has at least one endothermic peak temperature in the range of from 40° C. to 70° C. and at least one in the range of from 80° C. to 130° C.

10. The image bearing member protecting agent according to claim 1, wherein the image bearing member has a partially-hydrophilized surface and the protecting agent covers said surface of the image bearing member such that the hydrophilized areas of the surface of the image bearing member can be hydrophobized.

* * * * *